(12) United States Patent
Nonaka et al.

(10) Patent No.: US 7,924,473 B2
(45) Date of Patent: Apr. 12, 2011

(54) APPARATUS AND METHOD FOR IMAGE EVALUATION AND PROGRAM THEREOF

(75) Inventors: Shunichiro Nonaka, Asaka (JP); Yuko Matsui, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1288 days.

(21) Appl. No.: 11/302,347

(22) Filed: Dec. 14, 2005

(65) Prior Publication Data

US 2006/0126124 A1 Jun. 15, 2006

(30) Foreign Application Priority Data

Dec. 15, 2004 (JP) ................................. 2004/363062
Feb. 21, 2005 (JP) ................................. 2005/044076

(51) Int. Cl.
*H04N 1/00* (2006.01)
(52) U.S. Cl. ......... 358/403; 358/1.9; 382/224; 382/227; 382/305
(58) Field of Classification Search .................. 358/1.1, 358/1.6, 1.9, 1.15, 1.18, 2.1, 403; 382/112, 382/224, 227, 305; 348/207.2, 231.2, 231.3
See application file for complete search history.

(56) References Cited

U.S. PATENT DOCUMENTS

| | | | | |
|---|---|---|---|---|
| 6,240,424 B1 * | 5/2001 | Hirata | ............................ | 707/749 |
| 6,247,009 B1 * | 6/2001 | Shiiyama et al. | ....................... | 1/1 |
| 6,363,178 B1 * | 3/2002 | Chiba et al. | ..................... | 382/305 |
| 6,606,411 B1 * | 8/2003 | Loui et al. | ....................... | 382/224 |
| 6,834,130 B1 * | 12/2004 | Niikawa et al. | ................ | 382/305 |
| 6,869,156 B2 * | 3/2005 | Inoue et al. | ........................ | 347/5 |
| 6,932,523 B1 * | 8/2005 | Yamada et al. | .................. | 400/78 |
| 6,965,404 B2 * | 11/2005 | Hosoda et al. | ............. | 348/231.6 |
| 7,333,241 B2 * | 2/2008 | Nakabayashi et al. | ......... | 358/1.9 |
| 7,379,202 B2 * | 5/2008 | Kazami | .......................... | 358/1.16 |
| 7,620,270 B2 * | 11/2009 | Matraszek et al. | ............. | 382/305 |
| 7,783,115 B2 * | 8/2010 | Matsui et al. | .................. | 382/227 |
| 2003/0030669 A1 * | 2/2003 | Ono | ............................... | 345/747 |
| 2004/0172440 A1 * | 9/2004 | Nakajima et al. | ............. | 709/200 |
| 2004/0258304 A1 * | 12/2004 | Shiota et al. | ................... | 382/170 |

FOREIGN PATENT DOCUMENTS

| | | |
|---|---|---|
| JP | 11-239317 | 8/1999 |
| JP | 2001-256498 | 9/2001 |
| JP | 2002-10179 | 1/2002 |
| JP | 2003-216653 | 7/2003 |
| JP | 2004-302764 | 10/2004 |

OTHER PUBLICATIONS

Inuoe Akira (JP Publication 2002-010179) English Translation.*
Japanese Office Action dated May 18, 2010 (with partial English translation).

* cited by examiner

*Primary Examiner* — Twyler L Haskins
*Assistant Examiner* — Dennis Dicker
(74) *Attorney, Agent, or Firm* — McGinn IP Law Group PLLC

(57) ABSTRACT

An image evaluation apparatus includes a printing status judgment unit for judging a printing status of a target image assigned with an evaluation value and an evaluation value changing unit for appropriately changing the evaluation value based on information representing the printing status. An image evaluation method and a program for causing a computer to execute the image evaluation method are also provided. Therefore, the evaluation value can be assigned to the image, reflecting an intention and preference of a user at the time of selection of an image for printing.

8 Claims, 17 Drawing Sheets

| ANALYSIS ITEMS (EXAMPLES) |
| --- |
| FILE NAME |
| FILE PATH |
| FILE SIZE |
| TIME AND DATE OF FILE GENERATION/UPDATE |
| IMAGE SIZE |
| COMPRESSION TYPE |
| YCC PIXEL COMPOSITION (THINNING RATE OF C) |
| YCC PIXEL COMPOSITION (POSITIONS OF Y AND C) |
| COLOR CONVERSION MATRIX COEFFICIENT |
| IMAGE TITLE |
| NAME OF MANUFACTURER OF IMAGE INPUT DEVICE |
| MODEL NAME OF IMAGE INPUT DEVICE |
| SOFTWARE USED |
| NAME OF CREATOR |
| NAME OF COPYRIGHT HOLDER FOR PHOTOGRAPHY/EDITING |
| COLOR SPACE INFORMATION |
| USER'S COMMENT |
| RELATED AUDIO FILE |
| TIME AND DATE OF ORIGINAL IMAGE DATA GENERATION |
| TIME AND DATE OF DIGITAL DATA GENERATION |
| PHOTOGRAPHY CONDITION |
| SUBJECT INFORMATION |

FIG.18

APPARATUS AND METHOD FOR IMAGE EVALUATION AND PROGRAM THEREOF

BACKGROUND OF THE INVENTION

1. Field of the Invention

The present invention relates to an image evaluation apparatus and an image evaluation method for changing an evaluation value that is assigned to an image and represents a result of evaluation of the image. The present invention also relates to a program for causing a computer to execute the image evaluation method.

In addition, the present invention also relates to an apparatus and a method for automatically selecting an image whose printing is recommended from a plurality of image data sets according to preference of a user. The present invention also relates to a program for causing a computer to execute the method.

2. Description of the Related Art

Any user can store a large number of images in a recording medium, thanks to the spread of digital cameras and a soaring increase in capacity of recording media. On the other hand, an operation is necessary for selecting an image to be subjected to processing such as printing from a large amount of images. Therefore, in order to carry out efficient image selection, a function is desired for screening images according to certain conditions before a user finally determines an image to print, or for selecting an image appropriate for printing according to preference of a user.

In Japanese Unexamined Patent Publication No. 2002-010179, a method of automatic selection of an image appropriate for printing has been proposed based on an evaluation value regarding image lightness, or an acceleration sensor, or autofocus (AF).

By assigning an evaluation value of some kind to an image according to the method described in Japanese Unexamined Patent Publication No. 2002-010179, an image appropriate for printing can be selected automatically from a plurality of images. For printing, an image having been printed once is infrequently selected additionally, and an image not having been printed is often selected.

However, in the case where a user has carried out printing once after viewing an image group and the user carries out printing again after viewing the same image group, an image having been printed once is selected again as an image appropriate for printing, according to the method described in Japanese Unexamined Patent Publication No. 2002-010179. Therefore, selection of the image does not reflect an intention of the user.

Furthermore, in Japanese Unexamined Patent Publication No. 2001-256498, a method has been proposed for classifying images into images suitable for printing and images not suitable for printing at the time of reception of a printing order regarding the images. In this method, the images are classified through analysis of whether each of the images is well focused and whether each of the images has appropriate lightness.

The methods described in Japanese Unexamined Patent Publications No. 2002-010179 and 2001-256498 are image selection techniques that pay attention only to image quality and a photography condition, and do not consider preference of a user. Importance or preference of an image varies from person to person, and an image to print is difficult to judge only by paying attention to image quality and a photography condition. For this reason, automatic image selection according to preference of a user has not necessarily been realized.

SUMMARY OF THE INVENTION

The present invention has been conceived based on consideration of the above circumstances. An object of the present invention is therefore to change an evaluation value assigned to an image so that an intention and preference of a user can be reflected in selection of an image to print.

Another object of the present invention is to provide a personal computer, a digital camera, a printer, a print order apparatus and the like that enable efficient image selection reflecting an intention of a user.

An image evaluation apparatus of the present invention comprises:

printing status judgment means for judging a printing status of a processing target image assigned with an evaluation value; and evaluation value changing means for decreasing the evaluation value based on information representing the printing status.

Assigning the evaluation value refers not only to description of the evaluation value in a tag or header of the corresponding image but also to unification of a file describing the evaluation value with the image or to generation of a database with which the image and the evaluation value are registered by being related to each other.

In the image evaluation apparatus of the present invention, the information representing the printing status includes information on whether the target image is currently selected for printing. In this case, the evaluation value changing means decreases the evaluation value in the case where the target image is currently selected for printing.

Decreasing the evaluation value includes the case where the evaluation value is changed to 0.

In the image evaluation apparatus of the present invention, the information representing the printing status may include information on whether the target image has been printed in the past. In this case, the evaluation value changing means decreases the evaluation value in the case where the target image has been printed in the past.

Furthermore, in the image evaluation apparatus of the present invention, the information representing the printing status may include information on a ratio of the number of images having been printed in the past in an image group comprising images currently selected for printing.

In the case where the target image is included in a hierarchically classified category, the information representing the printing status in the image evaluation apparatus of the present invention may include information on whether the category including the target image has an image currently selected for printing. In this case, the evaluation value changing means decreases the evaluation value in the case where the category has the image currently selected for printing.

In the image evaluation apparatus of the present invention, the information representing the printing status may include information on whether the category including the target image has an image having been printed in the past. In this case, the evaluation value changing means decreases the evaluation value in the case where the category has the image having been printed in the past.

In the image evaluation apparatus of the present invention, the information representing the printing status may include information on whether an upper-level category of the category including the target image has an image currently selected for printing. In this case, the evaluation value changing means decreases the evaluation value in the case where the upper-level category has the image currently selected for printing.

An image evaluation method of the present invention comprises the steps of:

judging a printing status of a processing target image assigned with an evaluation value; and decreasing the evaluation value based on information representing the printing status.

The image evaluation method of the present invention may be provided as a program for causing a computer to execute the method.

The present invention also provides an apparatus and a method for automatically selecting an image whose printing is recommended according to a parameter calculated for representing preference of a user, based on use history of the user such as viewing, reproduction, and selection of an image and based on a result of image analysis regarding image quality, a subject, a photography condition, and the like.

More specifically, an automatic printing-recommended image selection apparatus of the present invention comprises:

data storage means for storing use history of a user and a parameter;

analysis means for analyzing image data;

parameter calculation means for calculating the parameter representing preference of the user, based on the use history of the user and a result of the analysis;

judgment means for judging an image whose printing is recommended from the image data, based on the parameter; and means for outputting the image having been judged.

Use in the use history refers to viewing, reproduction, and selection of an image represented by the image data, file name change or addition regarding the image, and update of a comment added to the image, for example. As items of the analysis carried out by the analysis means can be listed file information such as a file name and a path name of the image data, a structure of the image data (size, resolution, and pixel composition such as YCC, for example) and a photography condition (such as exposure duration, distance to a subject, time and date of photography, and a photography location). The analysis means carries out the analysis on a necessary part of the items, based on the image represented by the image data and accompanying information of the image.

The parameter is a value found according to a weight of each of the analysis items, based on the use history. The automatic printing-recommended image selection apparatus of the present invention recalculates and updates the parameter when the use history is updated and when new image data are obtained. If the current parameter is considered at the time of update thereof, a load of recalculation is reduced, which is more preferable. Whenever the user uses the automatic printing-recommended image selection apparatus, reliability on the data representing preference of the user becomes higher and image selection according to the preference can be realized.

It is more preferable for the automatic printing-recommended image selection apparatus of the present invention to further comprise means for obtaining a purpose of image printing. The printing purpose may be obtained through input carried out by the user, or with use of means for automatically inferring the purpose. The printing purpose can be classified according to who needs a print (such as the user himself/herself, a family member or a relative of the user, and a friend of the user), and according to the type of event represented by the image (such as a trip, wedding, an athletic contest, and a one-day event like a visit to an amusement park, for example).

According to the image evaluation apparatus of the present invention, the printing status is judged for the target image, and the evaluation value is decreased according to the information on the printing status. Therefore, in the case where the target image is currently selected or has been selected in the past for printing, the evaluation value is changed to become smaller. In this manner, the image appropriate for printing can be selected according to the evaluation value for reflecting an intention of the user.

Furthermore, according to the automatic printing-recommended image selection apparatus of the present invention, the parameter representing preference and a printing tendency of the user is calculated from the use history of the user and the image analysis result, and the printing-recommended image is selected based on the parameter. Therefore, the image reflecting the preference can be selected. In addition, the parameter is calculated again and updated whenever the use history is updated. Therefore, the more the user uses the automatic printing-recommended image selection apparatus, the higher the reliability of the parameter representing the preference becomes. In this manner, image selection that can better reflect an intention of the user can be realized.

BRIEF DESCRIPTION OF THE DRAWINGS

FIG. 18 shows examples of items of image analysis carried out by the automatic printing-recommended image selection apparatus of the present invention.

DESCRIPTION OF THE PREFERRED EMBODIMENTS

First Embodiment

Hereinafter, an image evaluation apparatus of an embodiment of the present invention will be described with reference to the accompanying drawings. The image evaluation apparatus in a first embodiment of the present invention may be installed in a personal computer, a digital camera, or the like, or accessible as a separate apparatus.

Figure 1:
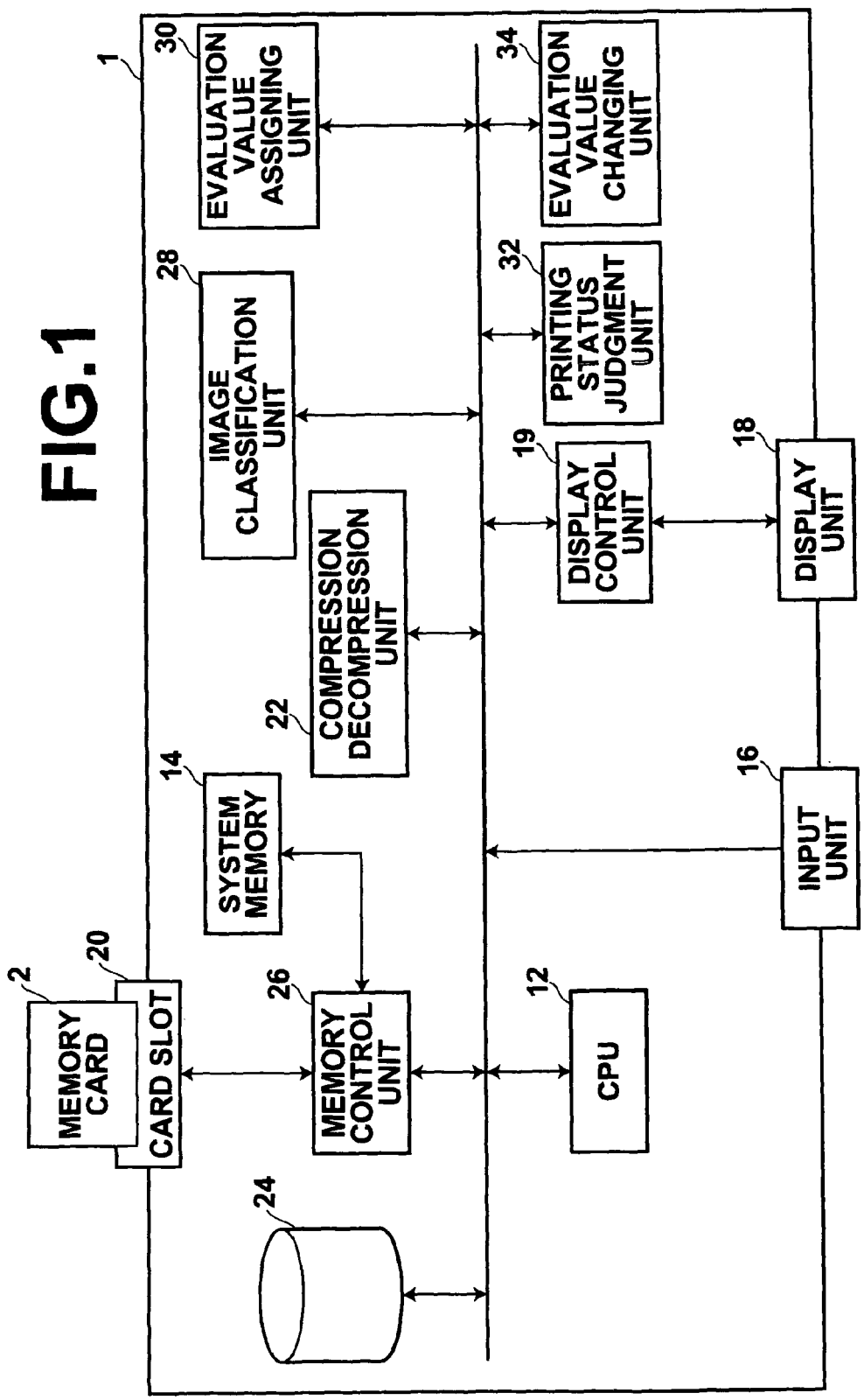
FIG. 1 is a block diagram showing the configuration of an image evaluation apparatus of a first embodiment of the present invention.

FIG. 1 is a block diagram showing the configuration of the image evaluation apparatus of the first embodiment of the present invention. As shown in FIG. 1, an image evaluation apparatus 1 in the first embodiment comprises a CPU 12, a system memory 14, an input unit 16, a display unit 18, and a display control unit 19. The CPU 12 carries out various kinds of control such as image recording control, display control, and control of each unit comprising the apparatus 1. The system memory 14 comprises a ROM for storing a program for operating the CPU 12, viewer software for image viewing and print order, and various constants. The system memory 14 also comprises a RAM used as a workspace for the CPU 12. The input unit 16 comprises a keyboard and a mouse for inputting various kinds of instructions to the apparatus 1. The display unit 18 comprises a liquid crystal display monitor and the like used for various kinds of display. The display control unit 19 controls the display unit 18.

The viewer software enables a user to place a print order regarding an image viewed by the user. Order information such as the file name of an image to print, quantity and size of prints, and the like is stored in a memory card 2.

The image evaluation apparatus 1 also comprises a card slot 20 for reading images from the memory card 2 and for recording images in the memory card 2, a compression decompression unit 22 for compressing the images according to a method using JPEG, motion JPEG, and the like and for decompressing the compressed images, a hard disc 24 for storing the images and various kinds of programs executed by the CPU 12, and a memory control unit 26 for controlling the system memory 14, the card slot 20, and the hard disc 24.

The image evaluation apparatus 1 further has an image classification unit 28 for classifying the images stored in a folder desired by the user in the hard disc 24 into hierarchical categories, an evaluation value assigning unit 30 for assigning an evaluation value to each of the images after the classification, a printing status judgment unit 32 for judging a printing status of a processing target image as will be described later, and an evaluation value changing unit 34 for changing the evaluation value assigned to each of the images according to information representing the printing status judged by the printing status judgment unit 32.

The image classification unit 28 classifies the images in the hard disc 24 into the hierarchical categories. More specifically, the image classification unit 28 classifies the images according to a method described in Japanese Unexamined Patent Publication No. 2000-112997. In this method, the images are arranged along a time axis according to photography time information representing time and date of photography of the respective images, and classified into the categories according to a difference in the photography time between two of the images neighboring each other along the time axis. Alternatively, the image classification unit 28 may classify the images into the categories corresponding to a schedule of the user with reference to schedule information representing the schedule, according to a method described in Japanese Unexamined Patent Publication No. 2003-108973. The image classification unit 28 may classify the images into the categories based on a relationship between characteristic quantities calculated from the images, according to a method described in Japanese Unexamined Patent Publication No. 2001-256244.

The evaluation value assigning unit 30 obtains processed images by carrying out image processing comprising at least one of: gradation correction processing, color correction processing, lightness correction processing, white balance correction processing, saturation correction processing, sharpness processing, noise reduction processing, red-eye correction processing, and skin enhancement processing on all the images after the classification, according to a predetermined algorithm. The evaluation value assigning unit 30 calculates a representative quantity of changes in pixel values corresponding to each other in each of the processed images and a non-processed image represented by a corresponding one of the images before the image processing. As the changes in the pixel values can be used changes in the pixel values themselves (such as square roots of squares of differences $\Delta R$, $\Delta G$, and $\Delta B$ in RGB values between the corresponding pixels in the processed images and the non-processed images in the case where the pixel values comprise the RGB values) and absolute values of differences in luminance values found from the RGB values, for example. In this embodiment, a mean of the changes in the pixel values is used as the representative quantity, which is not necessarily limited thereto. As long as the changes in the pixel values can be represented, any value such as a median of the changes in the pixel values can be used.

The evaluation value assigning unit 30 may normalize the mean of the changes in the pixel values according to Equation (1) below, for using the normalized value as the representative quantity:

$$\text{representative quantity} = (1 - \text{the mean of the changes/a maximum of the changes}) \times 100 \quad (1)$$

where the maximum is the largest value in the changes calculated for all the images.

The smaller the representative quantity is, the smaller the changes are at the time of the image processing. In other words, the corresponding image has been photographed well. Therefore, the evaluation value assigning unit 30 sets the evaluation value in such a manner that the evaluation value becomes larger as the representative quantity becomes smaller. The evaluation value assigning unit 30 then assigns the evaluation value to the corresponding image. For example, the evaluation value assigning unit 30 finds the evaluation value as a reciprocal of the representative quantity, or by subtracting the representative quantity from a predetermined value, or by setting a value for each of value ranges of the representative quantity, for example.

In the case where images are classified into a plurality of categories, people often think that the larger the number of images is in a category, the more important the category is. Furthermore, in categories of hierarchical structure, a category is often thought to be more important if the number of images becomes larger in a category above the category. In addition, a category is often thought to be more important if the number of categories becomes larger at the same hierarchical level sharing the same upper-level category immediately above the category. A category is also thought to be more important as the number of hierarchical levels below the category becomes larger. Furthermore, people often think that a category is more important as the number of hierarchical levels from the uppermost level to the level of the category becomes larger.

Therefore, the evaluation value assigning unit 30 may set a degree of importance for each of the categories classified by the image classification unit 28 according to at least one of: the number of images included in the category, the number of images included in an upper-level category, the number of categories related to the category, the number of hierarchical levels below the category, and the number of hierarchical levels from the uppermost level to the category. In this case, the evaluation value assigning unit 30 uses the degree of importance for each of the categories as the evaluation value for each of the images included therein. Hereinafter, how the degree of importance is set will be described.

Figure 2:
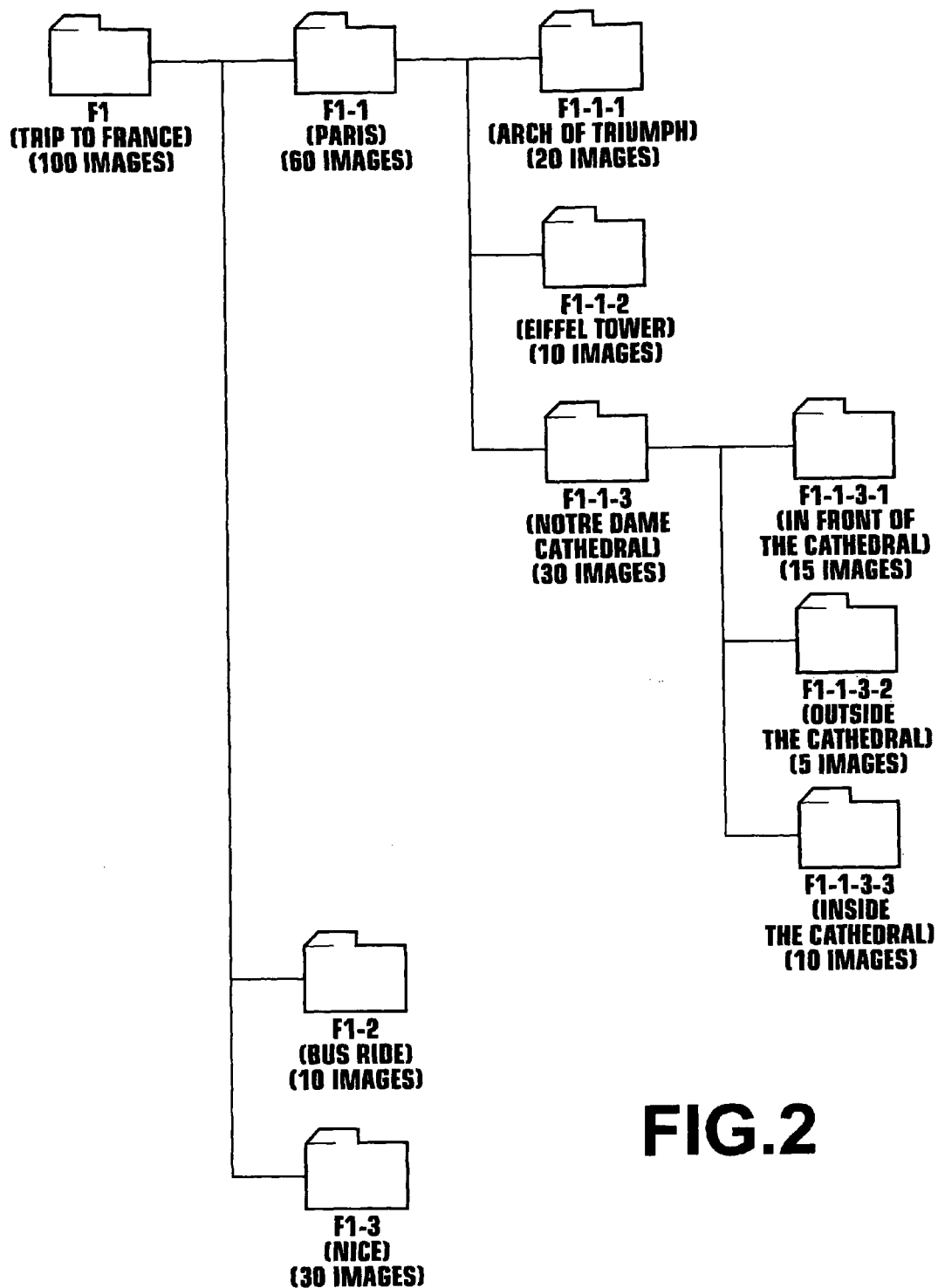
FIG. 2 shows a folder structure after classification.

As shown in FIG. 2, 100 images have been obtained in a trip to France, and 60 of the images have been classified into a category of Paris, while 10 of the images have been classified into a category of bus ride. The remaining 30 images have been classified into a category of Nice. In the category of Paris, 20 images have been classified into a category of the Arch of Triumph while 10 images have been classified into a category of the Eiffel Tower. The remaining 30 images have been classified into a category of the Notre Dame Cathedral under the category of Paris. Under the category of the Notre Dame Cathedral, 15 images have been classified into a category "In Front Of the Cathedral" while 5 images have been classified into a category "Outside the Cathedral". The remaining 10 images have been classified into a category "Inside the Cathedral" under the category of the Notre Dame Cathedral.

The evaluation value assigning unit 30 calculates the degree of importance for each of the categories through weighted addition of the number of images in the category, the number of categories related to the category, and the number of hierarchical levels below the category, according to Equation (2) below:

$$\text{degree} = a1 \times (\text{the number of images in the category}) + \\ b1 \times (\text{the number of categories related to the category}) + \\ c1 \times (\text{the number of levels below the category}) \quad (2)$$

where a1, b1, and c1 are weight coefficients (in this embodiment, a1=b1=c1=1).

The categories related to the category refer to hierarchical categories at the same level as the category and sharing the same category immediately above the category. Therefore, in this embodiment, the related categories refer to the categories of Paris, bus ride, and Nice. In addition, the categories of the Arch of Triumph, the Eiffel Tower, and the Notre Dame Cathedral are also regarded as the related categories. Likewise, the categories "In Front Of the Cathedral", "Outside the Cathedral", and "Inside the Cathedral" are also regarded as the related categories.

Figure 3:
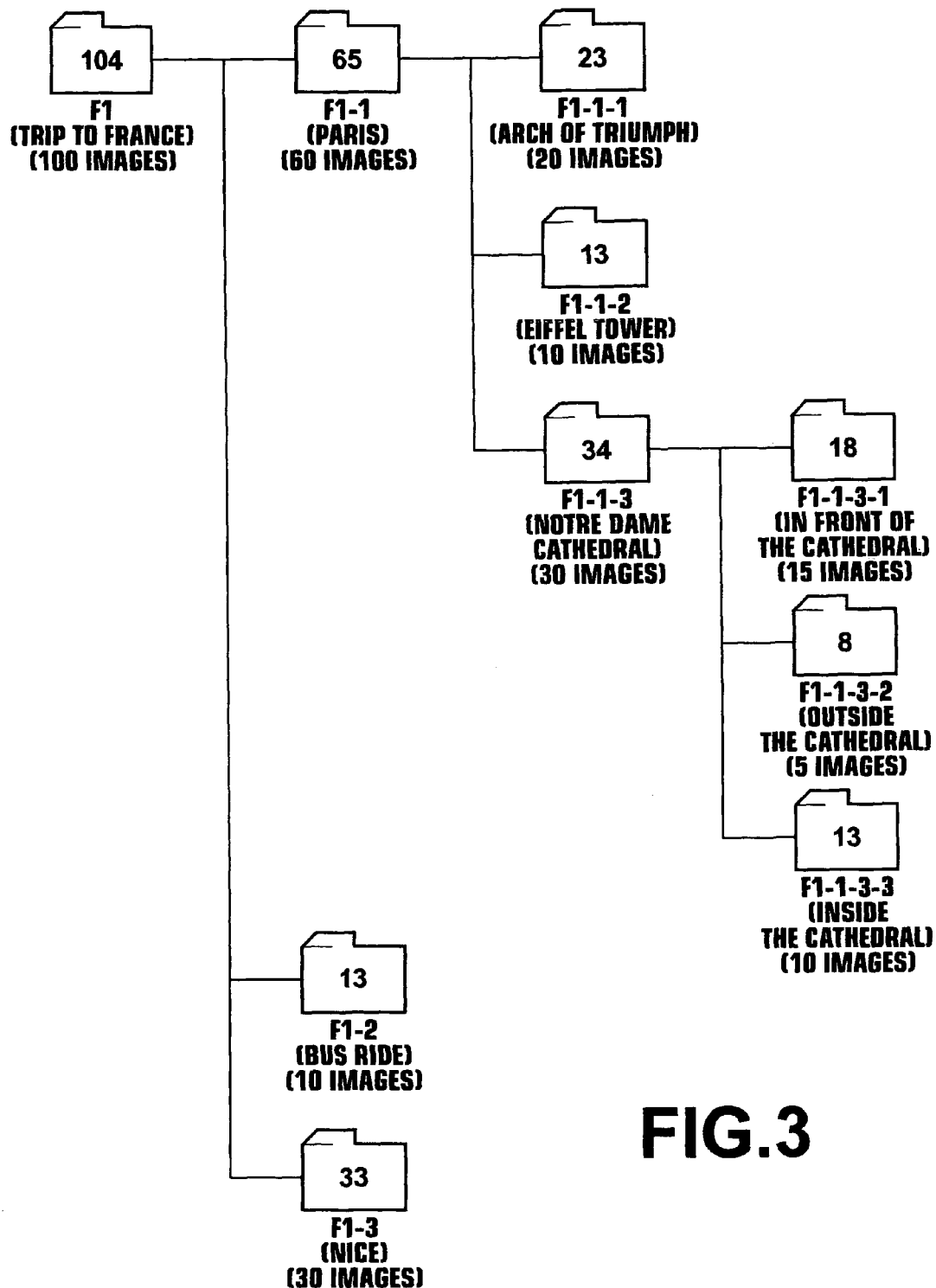
FIG. 3 shows the folder structure with degrees of importance.

For the category "Trip to France", the number of images in the category is 100, while the number of related categories and the number of lower-level categories are 1 and 3, respectively. Therefore, the degree of importance is found to be 104. The degree calculated in this manner is shown in FIG. 3.

The evaluation value assigning unit 30 assigns the degree of importance for the category to the images included therein, as the evaluation value therefor. For example, 18 is assigned as the evaluation value for the images in the category "In Front Of The Cathedral". In this embodiment, the evaluation value is assigned by being described in a tag of each of the images. However, a database (referred to as DB2) relating the file name of each of the images to the evaluation value thereof may be generated and stored in the hard disc 24, for assigning the evaluation value to the corresponding image. Alternatively, a file in which the evaluation value is described may be unified with the file of the corresponding image, for assigning the evaluation value thereto.

In this embodiment, the user can place a print order regarding any of the images viewed with use of the viewer software. In the case where any one of the images is selected for printing by the viewer software, the file name of the currently selected image is stored temporarily in the system memory 14. In the case where the print order has been placed after selecting the image for printing, a database DB1 is generated and stored in the hard disc 24 for registering the file name of the image for the order. The printing status judgment unit 32 refers to the file name of the image stored in the system memory 14 and the database DB1 stored in the hard disc 24, and judges the printing status for the target image as will be described later.

As shown below, the evaluation value changing unit 34 changes the evaluation value assigned to the target image, based on a result of the judgment by the printing status judgment unit 32.

(Method 1)

The printing status judgment unit 32 judges whether the target image is currently selected for printing, and the evaluation value changing unit 34 changes the evaluation value based on information on a result of the judgment, according to Equation (3) below:

$$H\text{new} = H\text{old} \times A \quad (3)$$

where Hnew is the evaluation value after the change, Hold is the evaluation value before the change, and A is 0 if the target image is currently selected for printing and 1 if otherwise.

Therefore, in the case where the target image is currently selected for printing, the evaluation value becomes 0. If the target image is not currently selected, the evaluation value is not changed.

(Method 2)

The printing status judgment unit 32 judges whether the target image is currently selected for printing and whether the target image has been printed in the past. The evaluation value changing unit 34 changes the evaluation value based on information on results of the judgment, according to Equation (4) below:

$$H\text{new} = H\text{old} \times A \times B \quad (4)$$

where Hnew is the evaluation value after the change, Hold is the evaluation value before the change, and A is 0 if the target image is currently selected for printing and 1 if otherwise. B is b ($0 \leqq = b \leqq 1$) in the case where the target image has been printed in the past while B is 1 in the case where the image has never been printed.

The value of b can be changed. The larger the quantity of prints of the image is, the smaller the value of b becomes. In the case where the target image has been printed in the past, the value of b may be 0.

Therefore, the evaluation value is 0 if the target image is currently selected for printing. In the case where the target image has been printed in the past, the evaluation value becomes smaller, and becomes 0 if b=0. In the case where the target image is not currently selected for printing and has never been printed, the evaluation value is not changed.
(Method 3)

The printing status judgment unit 32 judges whether the target image is currently selected for printing. The printing status judgment unit 32 also finds a ratio of the number of images having been printed in the past in a group of images currently selected for printing, in the case where the target image has been printed in the past. The evaluation value changing unit 34 changes the evaluation value based on information representing results of the judgment, according to Equation (5) below:

$$Hnew = Hold \times A \times C \qquad (5)$$

where Hnew is the evaluation value after the change, Hold is the evaluation value before the change, and A is 0 if the target image is currently selected for printing and 1 if otherwise. C is 1 in the case where the target image has never been printed while C is the ratio of the number of images having been printed in the image group currently selected for printing in the case where the target image has been printed in the past.

The value of C may be 0 in the case where the target image has been printed in the past.

Therefore, the evaluation value becomes 0 if the target image is currently selected for printing. In the case where the target image has been printed in the past, the evaluation value becomes smaller as the ratio of the number of images having been printed in the past becomes smaller in the image group currently selected for printing. In the case where the target image is not currently selected for printing and has never been printed, the evaluation value is not changed.
(Method 4)

The printing status judgment unit 32 judges whether the target image is currently selected for printing. The printing status judgment unit 32 also finds the ratio of the number of images having been printed in the past in the image group currently selected for printing and judges whether the category of the target image includes another image currently selected for printing, in the case where the target image has been printed in the past. The evaluation value changing unit 34 changes the evaluation value based on information representing results of the judgment, according to Equation (6) below:

$$Hnew = Hold \times A \times C \times D \qquad (6)$$

where Hnew is the evaluation value after the change, Hold is the evaluation value before the change, and A is 0 if the image is currently selected for printing and 1 if otherwise. C is 1 in the case where the image has never been printed while C is the ratio of the number of images having been printed in the image group currently selected for printing in the case where the target image has been printed in the past. D is d1 in the case where the category of the target image includes another image currently selected for printing while D is d2 if otherwise.

In the case where images have been classified in hierarchical categories as in this embodiment, images in the same category have been photographed in similar situations. Therefore, in the case where the category of the target image includes another image currently selected for printing, the values of d1 and d2 are set to satisfy d1<d2 (d1<1) so that the evaluation value becomes smaller. The value of d2 may be 1.

Therefore, in the case where the target image is currently selected for printing, the evaluation value becomes 0. In the case where the target image has been printed in the past, the evaluation value becomes smaller as the ratio of the number of images having been printed in the past becomes smaller in the image group currently selected for printing. In the case where the category of the target image includes another image currently selected for printing, the evaluation value is changed according to the value of d1. The evaluation value is also changed according to the value of d2 in the case where the target image is not currently selected for printing and has never been printed.
(Method 5)

The printing status judgment unit 32 judges whether the target image is currently selected for printing. In the case where the target image has been printed in the past, the printing status judgment unit 32 also finds the ratio of the number of images having been printed in the past in the image group currently selected for printing, and judges whether the category of the target image includes another image currently selected for printing and whether the category of the target image includes another image having been printed in the past. The evaluation value changing unit 34 changes the evaluation value based on information representing results of the judgment, according to Equation (7) below:

$$Hnew = Hold \times A \times C \times D \times E \qquad (7)$$

where Hnew is the evaluation value after the change, Hold is the evaluation value before the change, and A is 0 if the target image is currently selected for printing and 1 if otherwise. C is 1 in the case where the target image has never been printed while C is the ratio of the number of images having been printed in the image group currently selected for printing in the case where the target image has been printed in the past. D is d1 in the case where the category of the target image includes another image currently selected for printing while D is d2 if otherwise. E is e1 if the category of the target image includes another image having been printed in the past while D is e2 if otherwise.

In the case where images have been classified in hierarchical categories as in this embodiment, images in the same category have been photographed in similar situations. Therefore, in the case where the category of the target image includes another image having been printed in the past, the values of e1 and e2 are set to satisfy e1<e2 (e1<1) so that the evaluation value becomes smaller. The value of e2 may be 1.

Therefore, if the target image is currently selected for printing, the evaluation value becomes 0. In the case where the target image has been printed in the past, the evaluation value becomes smaller as the ratio of the number of the images having been printed in the past becomes smaller in the image group currently selected for printing. In the case where the category of the target image includes another image currently selected for printing, the evaluation value is changed according to the value of d1. The evaluation value is also changed according to the value of e1 in the case where the category of the target image has another image having been printed in the past. In addition, the evaluation value is changed according to the values of d2 and e2 in the case where the target image is not currently selected for printing and has never been printed.

Figure 4:
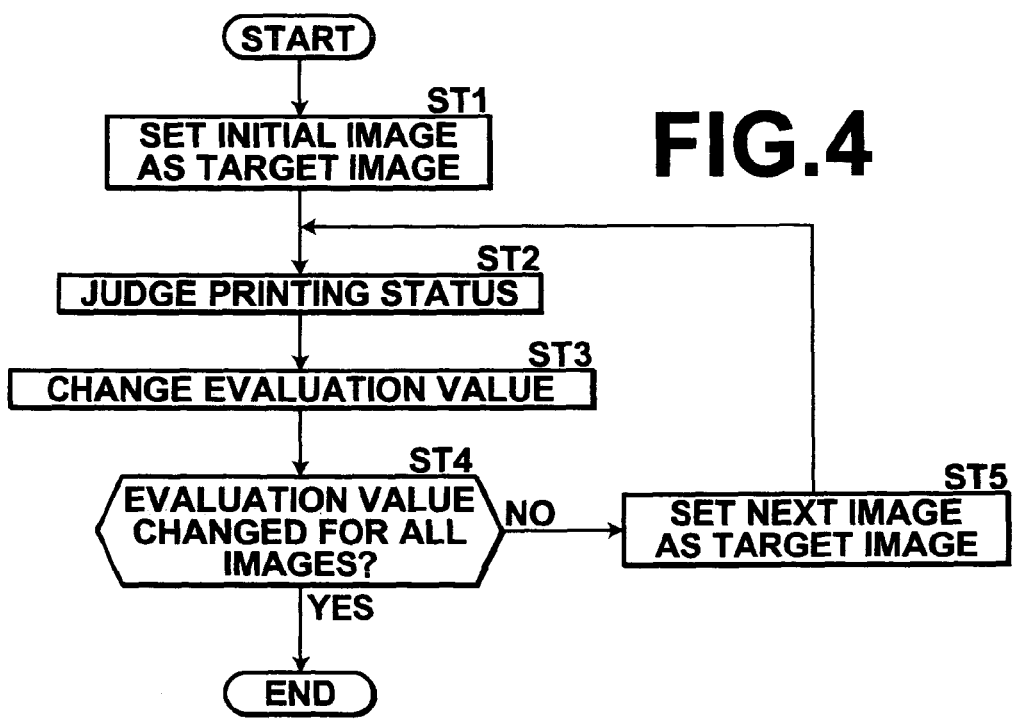
FIG. 4 is a flow chart showing a procedure carried out in the first embodiment.

A procedure carried out in this embodiment will be described next. FIG. 4 is a flow chart showing the procedure carried out in this embodiment. In this embodiment, the user has viewed the images stored in the memory card 2 and placed a print order regarding the images, with use of the viewer software. Therefore, the database DB1 has been stored in the hard disc 24. The evaluation value has been described in the tag of each of the images.

The procedure starts when the user starts the viewer software, and an initial image among the images in the memory card 2 is set to be the target image (Step ST1). The initial image may be an image having the earliest or latest time and date of photography, or an image having the smallest or largest number in the file name, for example. The printing status of the target image is then judged (Step ST2). The evaluation value of the target image is then changed based on the information representing the printing status (Step ST3). Whether the evaluation value has been changed for all the images is then judged (Step ST4). If a result at Step ST4 is negative, the next image is set to be the target image (Step ST5), and the procedure returns to Step ST2. If the result at Step ST4 is affirmative, the procedure ends.

If the evaluation value is large for any one of the images, the image has been photographed well. Therefore, the viewer software displays a predetermined number of the images whose evaluation value after the change is larger than a predetermined threshold value, as printing-recommended images on the display unit 18. In this manner, the user can easily select the images whose printing is recommended.

As has been described above, the printing status of the target image is judged in this embodiment, and the evaluation value is decreased based on the information representing the printing status. Therefore, in the case where any one of the images appropriate for printing is selected with reference to the evaluation value, the image can be selected according to an intention of the user.

Another embodiment of the present invention will be described below. In this embodiment, the printing status judgment unit 32 judges whether an upper-level category above the category including the target image has an image currently selected for printing, in addition to any one of Methods 1 to 4 above. The evaluation value changing unit 34 changes the evaluation value based on information representing a result of this judgment. Hereinafter, a procedure carried out in this embodiment will be described.

Figure 5:
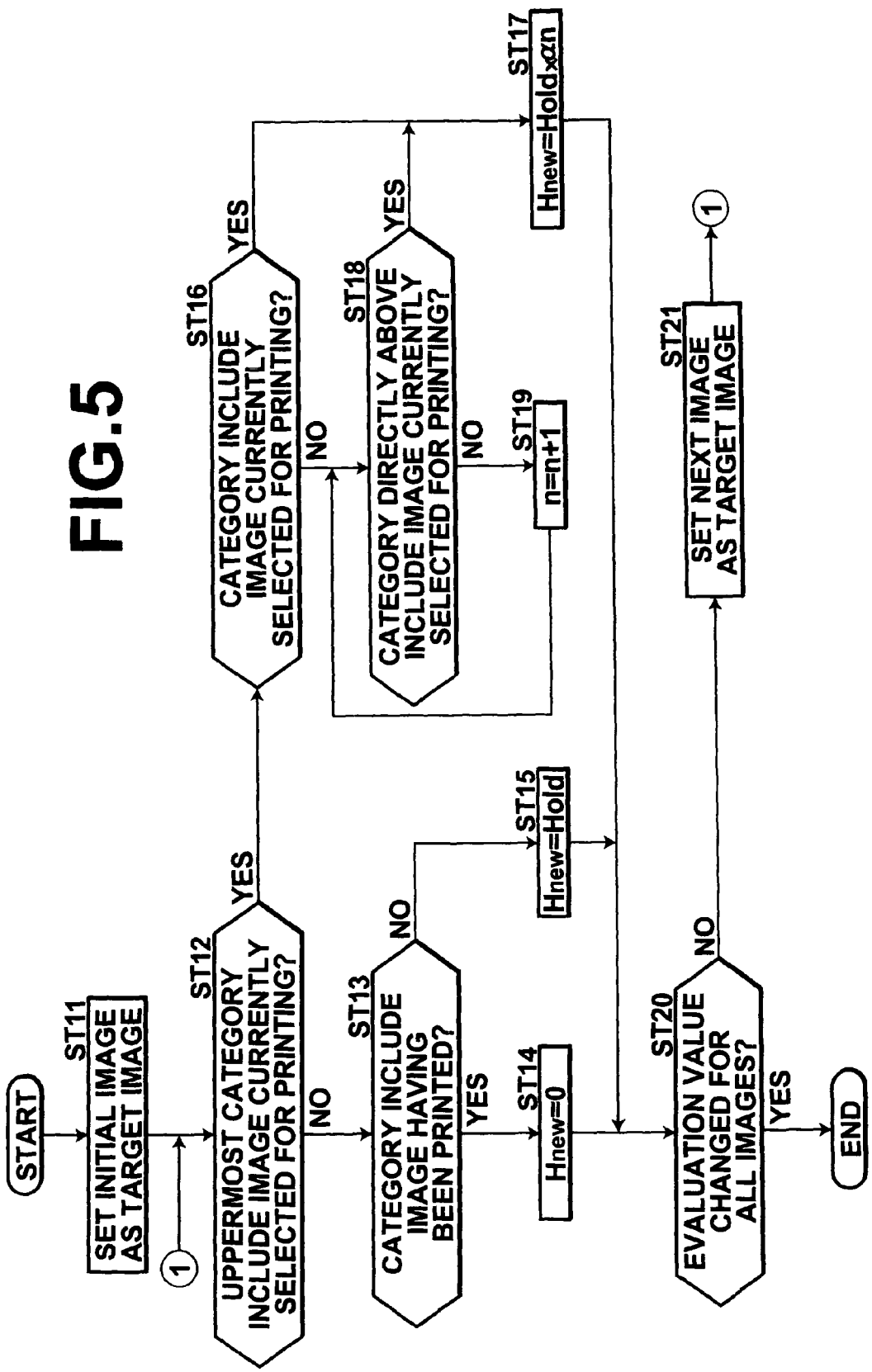
FIG. 5 is a flow chart showing a procedure carried out in another embodiment.

FIG. 5 is a flow chart showing the procedure carried out in this embodiment. In this embodiment, the user has viewed the images recorded in the memory card 2 and has placed a print order by using the viewer software. The database DB1 is also stored in the hard disc 24, and the evaluation value has been assigned to each of the images. The evaluation value is changed in this embodiment by judging whether an upper-level category of the category including the target image has an image currently selected for printing, in addition to Method 4.

The procedure starts when the user starts the viewer software, and the initial image among the images stored in the memory card 2 is set to be the target image (Step ST11). Judgment is then made as to whether the uppermost-level category including the category of the target image has an image currently selected for printing (Step ST12). If a result at Step ST12 is negative, whether the category of the target image has an image having been printed in the past is judged (Step ST13). If a result at Step ST13 is affirmative, the evaluation value Hnew is changed to be 0 (Step ST14). If the result at Step ST13 is negative, the evaluation value Hnew is set to be the current evaluation value Hold (Step ST15). In other words, the evaluation value is not changed.

If the result at ST12 is affirmative, whether the category of the target image has an image currently selected for printing is then judged (Step ST16). If a result at ST16 is affirmative, the evaluation value Hnew is changed to be Hold×αn (Step ST17). The value of αn changes in accordance with the level of the category being processed, and n−1 at Step ST17. If the level of the category becomes higher by 1, the value of n is increased by 1. The value of an is smaller than 1, and becomes larger as the value of n becomes larger.

If the result at Step ST16 is negative, judgment is made as to whether the category immediately above the category including the target image has an image currently selected for printing (Step ST18). If a result at ST18 is affirmative, the value of Hnew is set to be Hold×αn (Step ST17). If the result at Step ST18 is negative, let n=n+1 for increasing the level of the category to be processed by 1 (Step ST19). The procedure then returns to Step ST18. The procedure from ST16 is carried out when the result at ST12 is affirmative. Therefore, the result at ST18 becomes affirmative before the judgment is made on the uppermost category.

Whether the evaluation value has been changed for all of the images is then judged (Step ST20) after ST14, ST15, or ST17. If a result at Step ST20 is negative, the next image is set to be the target image (Step ST21), and the procedure returns to Step ST12. If the result at Step ST20 is affirmative, the procedure ends.

Figure 6:
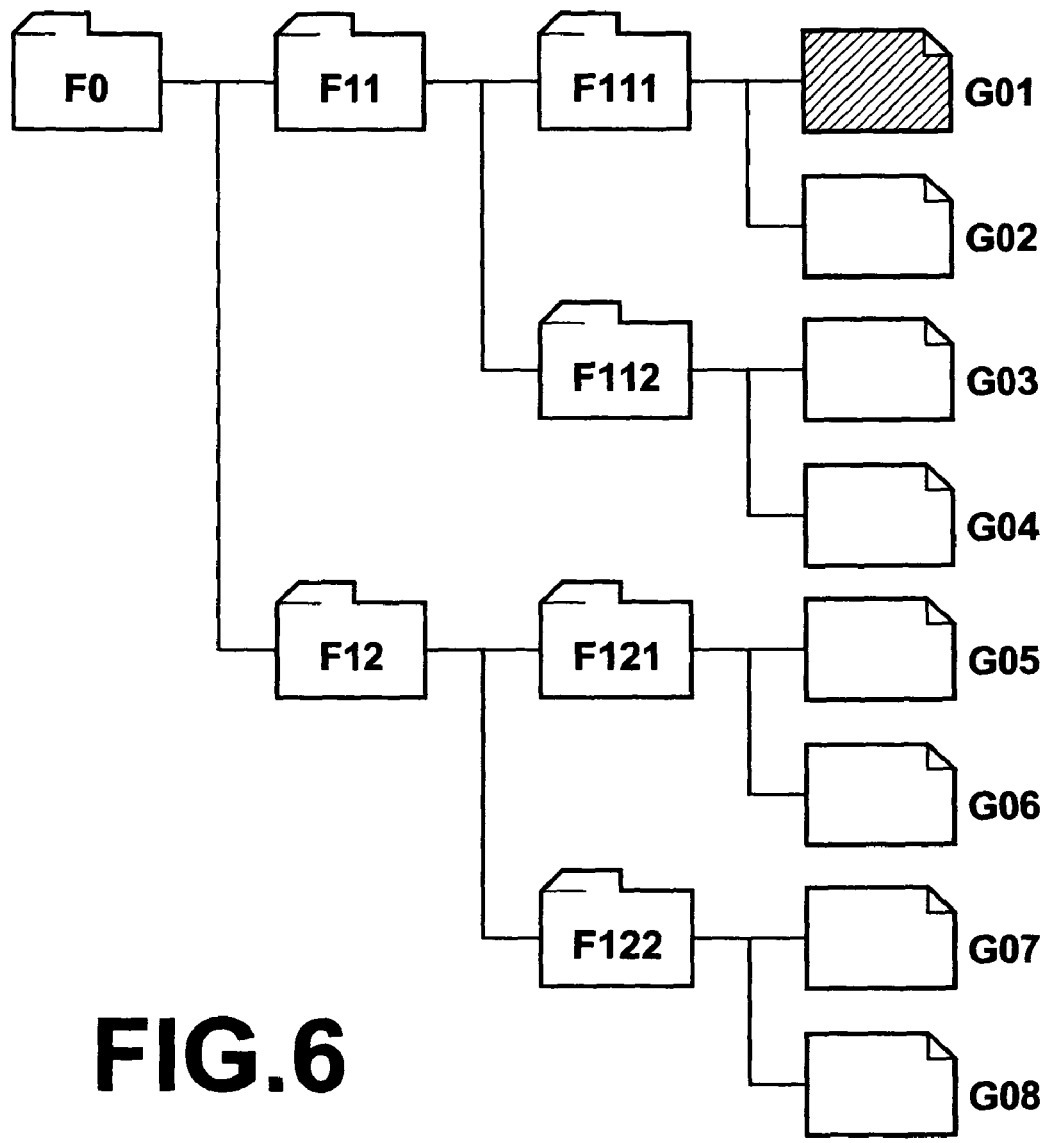
FIG. 6 shows changes in an evaluation value in the embodiment (part 1)
Figure 7:
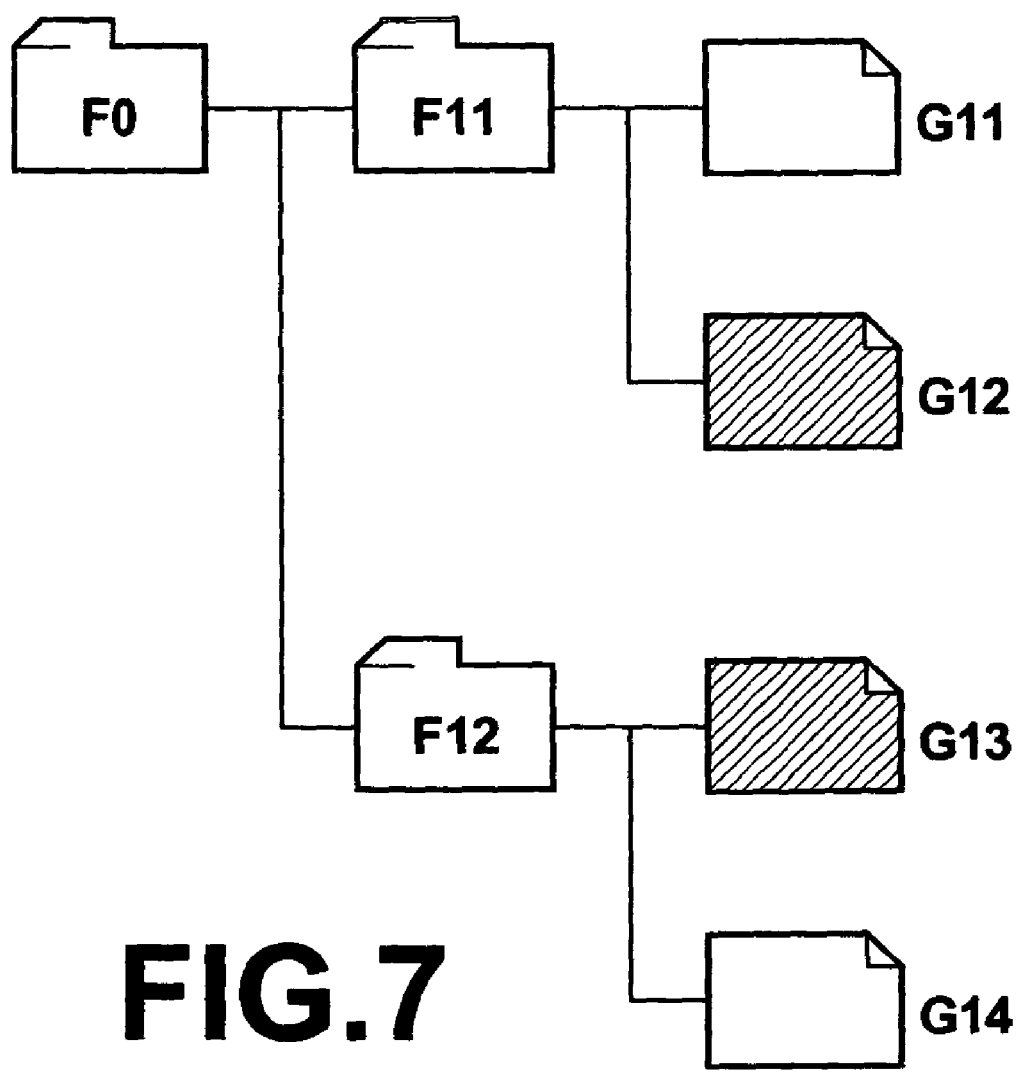
FIG. 7 shows changes in the evaluation value in the embodiment (part 2)

FIGS. 6 and 7 show how the evaluation value is changed in this embodiment. In FIG. 6, a hatched image G01 in a folder F111 is currently selected for printing. In this embodiment, the evaluation value is decreased for an image G02 in the folder F111. The evaluation value for images G03 and G04 in a folder F112 is changed more than the change in the evaluation value for the image G02, since α1<α2. The evaluation value for images G05 through G08 stored in folders F121 and F122 is changed more than the change in the evaluation value for the images G03 and G04, since α2<α3.

In FIG. 7, an image G12 stored in a folder F11 and an image G13 stored in a folder F12 have been printed in the past. In this embodiment, the evaluation value is 0 for an image G11 in the folder F11 and for an image G14 in the folder F12.

As has been described above, in this embodiment, the printing status of the target image is judged, and the evaluation value is decreased based on the information representing the printing status. Therefore, in the case where any one of the images appropriate for printing is selected according to the evaluation value, the image can be selected in accordance with an intention of the user.

In the embodiments described above, the image classification unit 28 classifies the images stored in the memory card 2. However, the user may classify the images manually.

In these embodiments, the evaluation value assigning unit 30 assigns the evaluation value to each of the images according to the representative quantity of the changes in the pixel values corresponding to each other between the processed images and the non-processed images. However, the evaluation value is not necessarily assigned according to this method. For example, the evaluation value may be assigned to each of the images based on information on lightness of the respective images or presence or absence of blur in the respective images. Alternatively, the user may manually assign the evaluation value to each of the images according to his/her preference.

Second Embodiment

An automatic printing-recommended image selection apparatus will be described as a second embodiment of the present invention. The automatic printing-recommended image selection apparatus may be installed in a personal computer or a digital camera, or accessible as a separate apparatus.

Figure 8:
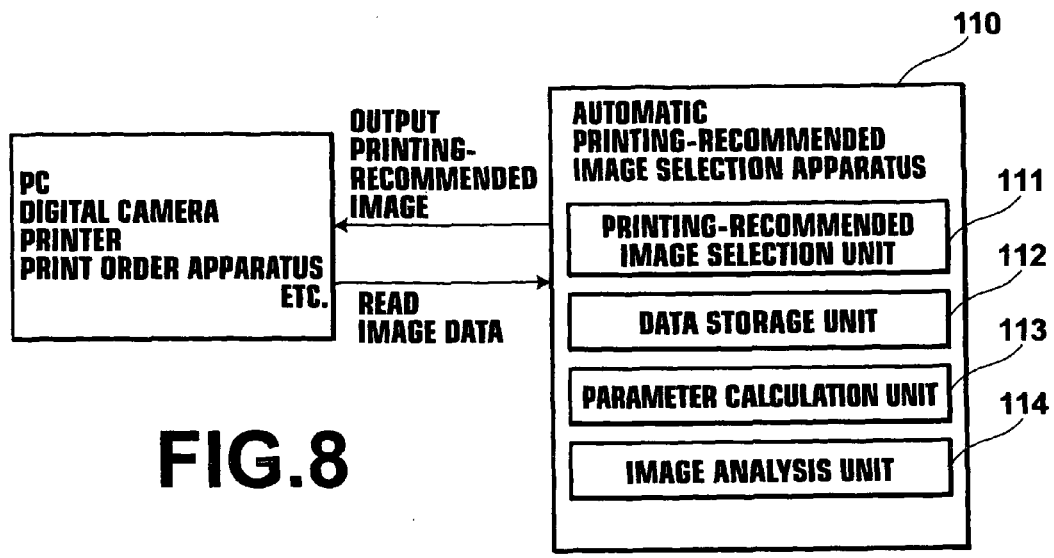
FIG. 8 is a block diagram showing the configuration of an automatic printing-recommended image selection apparatus of a second embodiment of the present invention.

FIG. 8 is a block diagram showing the configuration of the second embodiment.

An automatic printing-recommended image selection apparatus 110 comprises a printing-recommended image selection unit 111 for selecting an image based on automatic printing-recommended image selection parameters (hereinafter simply referred to as the parameters), a data storage unit 112 for storing the parameters and use history of a user, a parameter calculation unit 113 for calculating the parameters from the use history and a result of analysis of image data, and an image analysis unit 114 for analyzing the image data. The automatic printing-recommended image selection apparatus 110 has a function of reading the image data from a hard disc of a personal computer or a memory card of a digital camera, and is used by the user in a state where the automatic printing-recommended image selection apparatus 110 can access the hard disc or the memory card.

The automatic printing-recommended image selection apparatus 110 selects an image whose printing is recommended, with reference to the parameters. The automatic printing-recommended image selection apparatus 110 outputs the image to the personal computer or the digital camera.

The parameters quantify preference of the user for an image to print, based on characteristics of the images actually viewed or printed by the user. The parameters are calculated and updated whenever the user uses the images causing the use history to be updated. Therefore, whenever the automatic printing-recommended image selection apparatus is used, the values of the parameters representing the preference of the user become more reliable and are updated to better reflect the preference.

The image analysis unit 114 analyzes the images used by the user, regarding image quality, composition, and photography conditions, for example. More specifically, examples of items of the analysis are shown in FIG. 18. In order to calculate the parameters, the image analysis unit 114 analyzes the images used by the user for viewing, printing, selection, and the like. The image analysis unit 114 also analyzes the image data that are selectable, in order to compare the parameters calculated at the time of image selection with the characteristics of the images. The image analysis unit 114 may analyze a new image whenever the automatic printing-recommended image selection apparatus 110 reads the new image from the hard disc of the personal computer or the memory card of the digital camera so that results of the analysis can be stored in the image analysis unit 114. The characteristics of the images refer to values regarding the respective technical items on the image data and to an evaluation value combining all the values. For example, if Ei denotes the value of an $i^{th}$ technical item for any one of the images and P is the evaluation value of the image, P can be found as $$P = \Sigma W_i E_i \quad (8)$$

The evaluation value P and the values Ei for the respective items are the results of the analysis. Wi is a weight for the $i^{th}$ technical item, and is equivalent to the parameters. The evaluation value is not necessarily calculated in the above manner. The evaluation value may be calculated according to the same methods used by the evaluation value assigning unit 30 in the first embodiment, or may be changed appropriately by inclusion of means equivalent to the evaluation value changing unit 34 in the automatic printing-recommended image selection apparatus 110.

The parameter calculation unit 113 calculates the parameters with reference to the use history of the user and the results of the analysis by the image analysis unit 114. The parameters represent a tendency of printing and the preference of the user, and are calculated as the weights Wi of the items of the analysis by the image analysis unit 114. As a method of calculation, a part of the image data that have actually been printed by the user and the remaining image data that have never been printed may be compared for each of the items so that the weights can be set based on a statistical bias. Alternatively, the weights for an old one of the images may be decreased gradually whenever a new image is input, since a newer image is likelier to be printed. The parameters calculated by the parameter calculation unit 113 are stored in the data storage unit 112. When an operation by the user is detected for requesting the printing-recommended image, the latest parameters are always referred to for printing-recommended image selection.

The data storage unit 112 stores the latest parameters calculated by the parameter calculation unit 113 and the use history of the user. In the case where the automatic printing-recommended image selection apparatus has never been used, the data storage unit 112 stores standard values or 0s as initial values. The use history that records use of the images by the user may be stored in the hard disc of the personal computer or the data storage unit 112 of the printing-recommended image selection apparatus 110. Where the use history is stored is not limited as long as the automatic printing-recommended image selection apparatus 110 can refer to the use history. The "use" in the use history includes not only image selection but also image viewing and image reproduction. Furthermore, the use includes changing a file name or a path name of the image data, and writing and changing a comment added to the image data. A degree may also be determined for representing how the type of the use is considered into the calculation of the parameters.

The printing-recommended image selection unit 111 selects the image whose printing is recommended, based on the latest parameters stored in the data storage unit 112 and the results of the analysis carried out by the image analysis unit 114. More specifically, the image having the highest evaluation value calculated from the latest parameters is judged to be the printing-recommended image. The printing-recommended image selection unit 111 reads the image having been judged in this manner from the hard disc of the personal computer or the memory card of the digital camera, and outputs the image.

In this configuration, automatic image selection can be realized in consideration of the printing tendency and the preference of the user.

Third Embodiment

In a third embodiment of the present invention, an apparatus will be described for automatically selecting a printing-recommended image through consideration of a purpose of printing in addition to a printing tendency and preference of a user.

Figure 9:
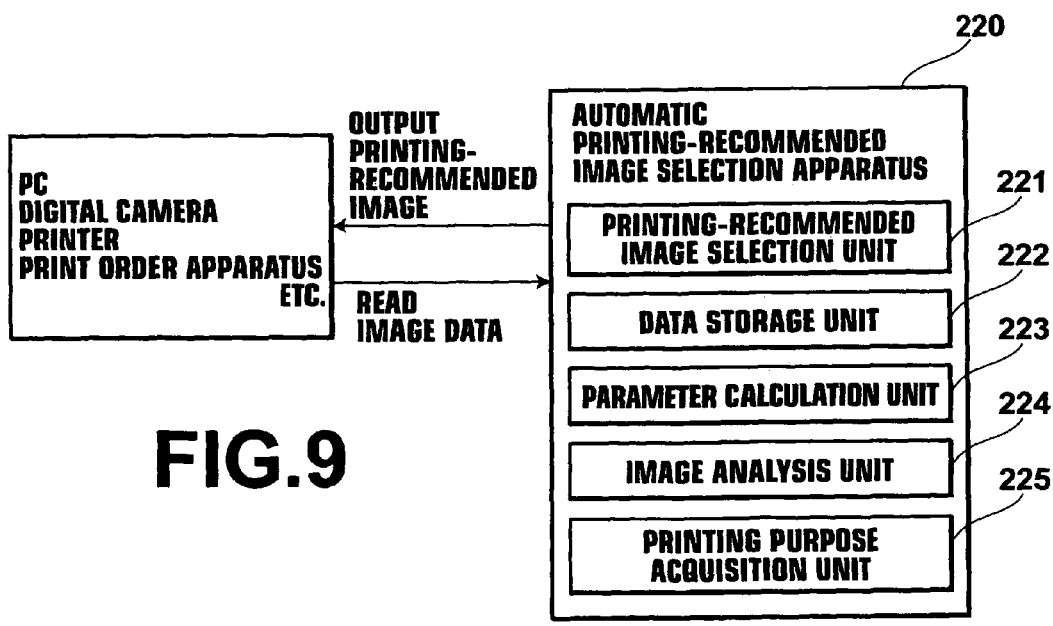
FIG. 9 is a block diagram showing the configuration of an automatic printing-recommended image selection apparatus of a third embodiment of the present invention.

As shown in FIG. 9, an automatic printing-recommended image selection apparatus 220 in this embodiment comprises a printing-recommended image selection unit 221, a data storage unit 222, a parameter calculation unit 223, an image analysis unit 224, and a printing purpose acquisition unit 225. Functions and operation of the printing-recommended image selection unit 221, the data storage unit 222, the parameter calculation unit 223, and the image analysis unit 224 are almost the same as in the automatic printing-recommended image selection apparatus 110 in the second embodiment. The automatic printing-recommended image selection apparatus 220 in the third embodiment has the printing purpose acquisition unit 225, which is a difference from the automatic printing-recommended image selection apparatus in the second embodiment.

The printing purpose acquisition unit 225 obtains a purpose of printing through input carried out by the user or with use of an automatic inference function. The purpose of printing refers to a purpose of printing of an image, such as sending an image of wedding of the user to a relative of the user, or sending an image of a trip to a friend of the user who accompanied the user during the trip. Therefore, the purpose of printing can be classified by who needs a printed image (such as the user, a family member or a relative of the user, or a friend of the user), and the type of event regarding a photographed image (such as a trip, wedding, an athletic contest, and a one-day event like a visit to an amusement park).

In the case where the printing purpose acquisition unit 225 obtains the purpose of printing through input carried out by the user, the printing purpose acquisition unit 225 needs to have a function of prompting the user to input the purpose of printing by using characters and a function of prompting the user to select the purpose from displayed items, and a function of judging the purpose of printing based on the characters input by the user and a selected one of the items.

In the case where the printing purpose acquisition unit 225 has the function of automatically inferring the printing purpose, the printing purpose acquisition unit 225 may analyze file names of image data viewed or reproduced by the user or read newly, path names of folders storing the image data, time and date of photography, and a comment added to the image data so that the printing purpose acquisition unit 225 can infer the printing purpose based on the type or frequency of character strings included therein, for example.

How the printing purpose acquisition unit 225 obtains the printing purpose is not necessarily limited to the methods described above. Any method can be used as long as the printing purpose can be obtained.

The parameter calculation unit 223 reflects the printing purpose obtained by the printing purpose acquisition unit 225 in the parameters. For example, in the case where the printing purpose is to send an image of wedding to a friend, the parameters reflecting the printing purpose can be calculated by weighting image data having the characters "wedding" in the file names or folder names and by weighting image data having the same date and timeframe of photography as the image data having the characters.

How the printing-recommended image is selected according to the calculated parameters is the same as in the second embodiment.

As has been described above, by including the printing purpose acquisition unit 225, automatic printing-recommended image selection and display can be realized according to the printing purpose and the preference of the user.

Fourth Embodiment

In a fourth embodiment of the present invention will be described the case where a personal computer has the printing-recommended image selection apparatus of the second or third embodiment of the present invention.

The personal computer has the automatic printing-recommended image selection apparatus by installation of the automatic printing-recommended image selection apparatus therein or by access to the automatic printing-recommended image selection apparatus as an external apparatus.

Figure 10:
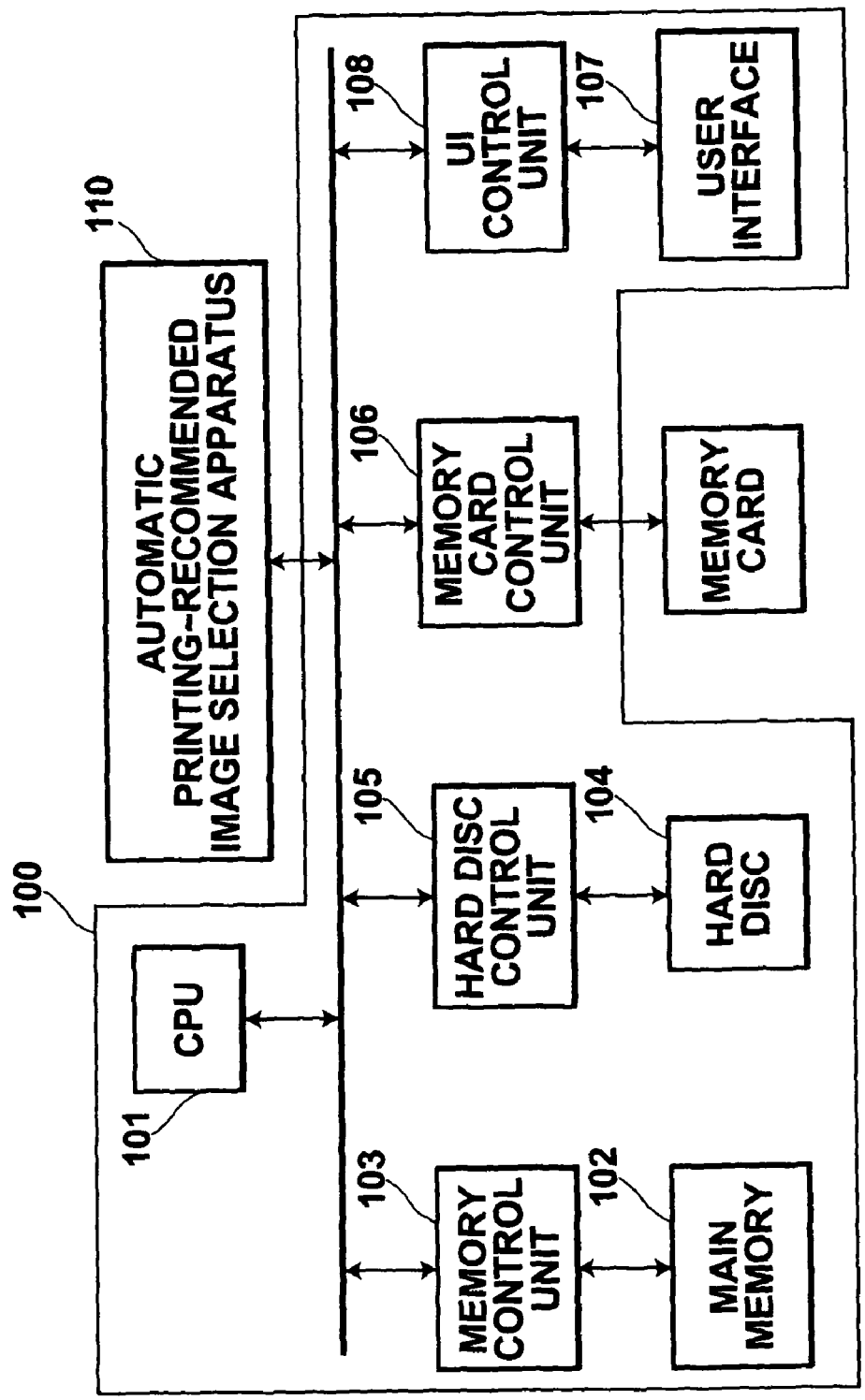
FIG. 10 is a block diagram showing the configuration of a fourth embodiment of the present invention as an application example of the automatic printing-recommended image selection apparatus of the present invention.

FIG. 10 is a block diagram showing the configuration of the fourth embodiment.

A personal computer 100 has a CPU-101, a main memory 102, a memory control unit 103 for controlling the main memory 102, a hard disc 104, a hard disc control unit 105 for controlling the hard disc 104, a memory card control unit 106 for controlling a memory card when the memory card is inserted, a user interface 107 comprising display means and operation means, and a user interface control unit 108 for controlling the user interface 107. In addition, the personal computer 100 has the automatic printing-recommended image selection apparatus 110 or 220 installed therein or accessible as an external apparatus. In FIG. 10, the personal computer 100 has the automatic printing-recommended image selection apparatus 110.

Figure 11:
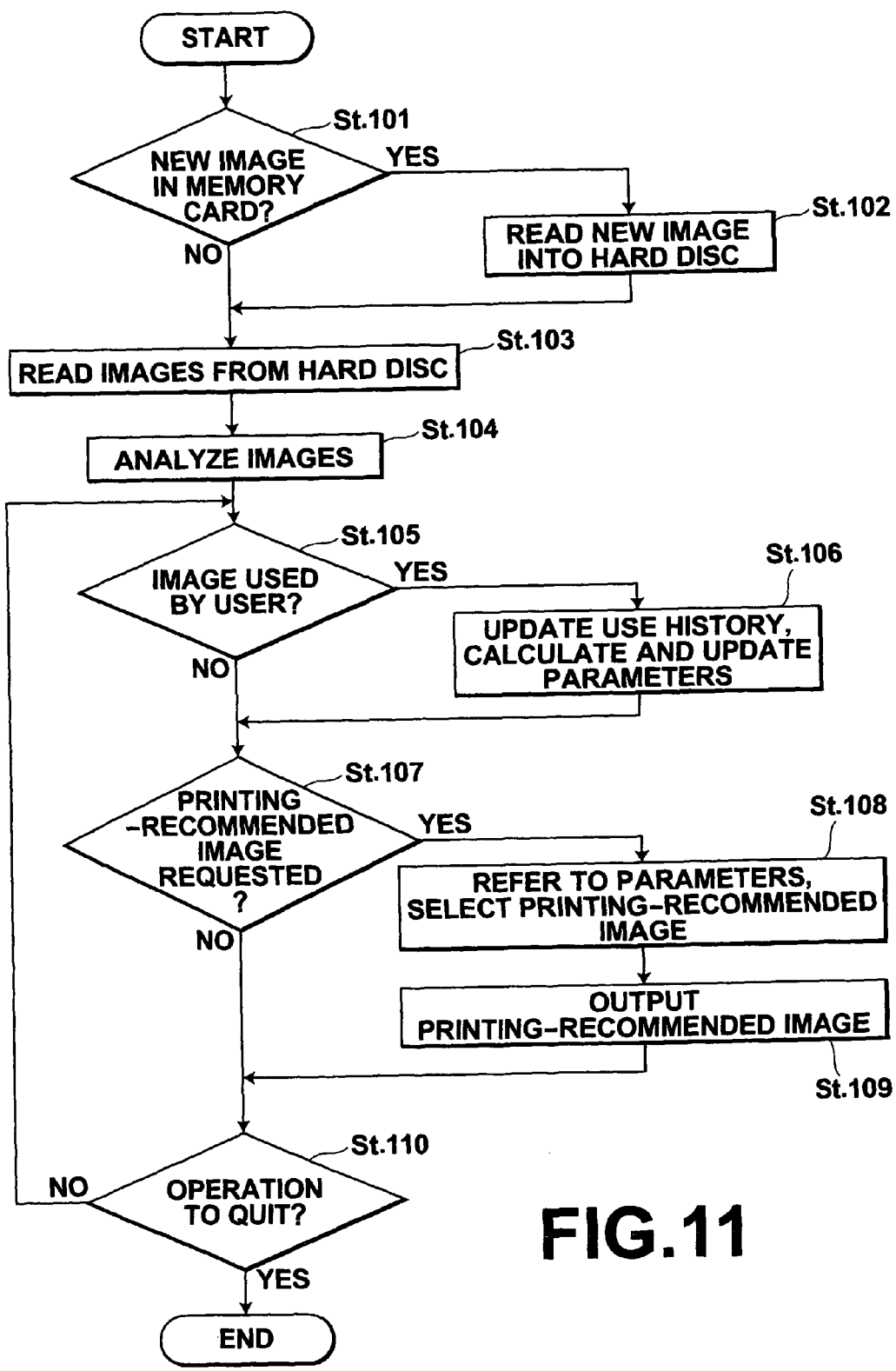
FIG. 11 is a flow chart showing an operation of the automatic printing-recommended image selection apparatus in the fourth embodiment.

Hereinafter, operation of the automatic printing-recommended image selection apparatus in this embodiment will be described with reference to FIG. 11.

When the memory card is inserted in the personal computer 100, the memory card control unit 106 and the CPU 101 detect whether the memory card has a new image (St. 101). If a result at St. 101 is affirmative, the new image is stored in the hard disc 104 (St. 102). The hard disc 104 stores image data sets of a plurality of images including the new image.

The automatic printing-recommended image selection apparatus 110 reads the image data sets from the hard disc 104 (St. 103). The image analysis unit 114 analyzes the image data sets that have been read, and obtains the characteristics (the values for the respective technical items and the evaluation value) of the image data sets (St. 104).

Whether the user has carried out any operation such as selection, viewing, and reproduction of the images is judged based on operation of the display means and the operation means of the user interface 107 (St. 105). If a result at St. 105 is affirmative, the use history of the user is updated, and the parameter calculation unit 113 calculates the parameters based on the use history and the results of the analysis of the images used by the user, for updating the parameters stored in the data storage unit 112 (St. 106).

Whether the user has carried out a printing-recommended image requesting operation is then judged (St. 107). If a result at St. 107 is affirmative, the printing-recommended image selection unit 111 selects the printing-recommended image from the image data sets read from the hard disc, by using the parameters having been updated (St. 108). The selected image is output from the automatic printing-recommended image selection apparatus 110 to the personal computer 100 to be displayed on the display means or the like of the personal computer 100 (St. 109).

Whether the user has carried out an operation to quit is then judged (St. 110). If a result at St. 110 is affirmative, the automatic printing-recommended image selection apparatus 110 ends the operation.

Fifth Embodiment

In a fifth embodiment of the present invention, a digital camera has the automatic printing-recommended image selection apparatus of the second or third embodiment of the present invention.

The digital camera has the automatic printing-recommended image selection apparatus by installation of the automatic printing-recommended image selection apparatus therein or through access to the automatic printing-recommended image selection apparatus as an external apparatus.

Figure 12:
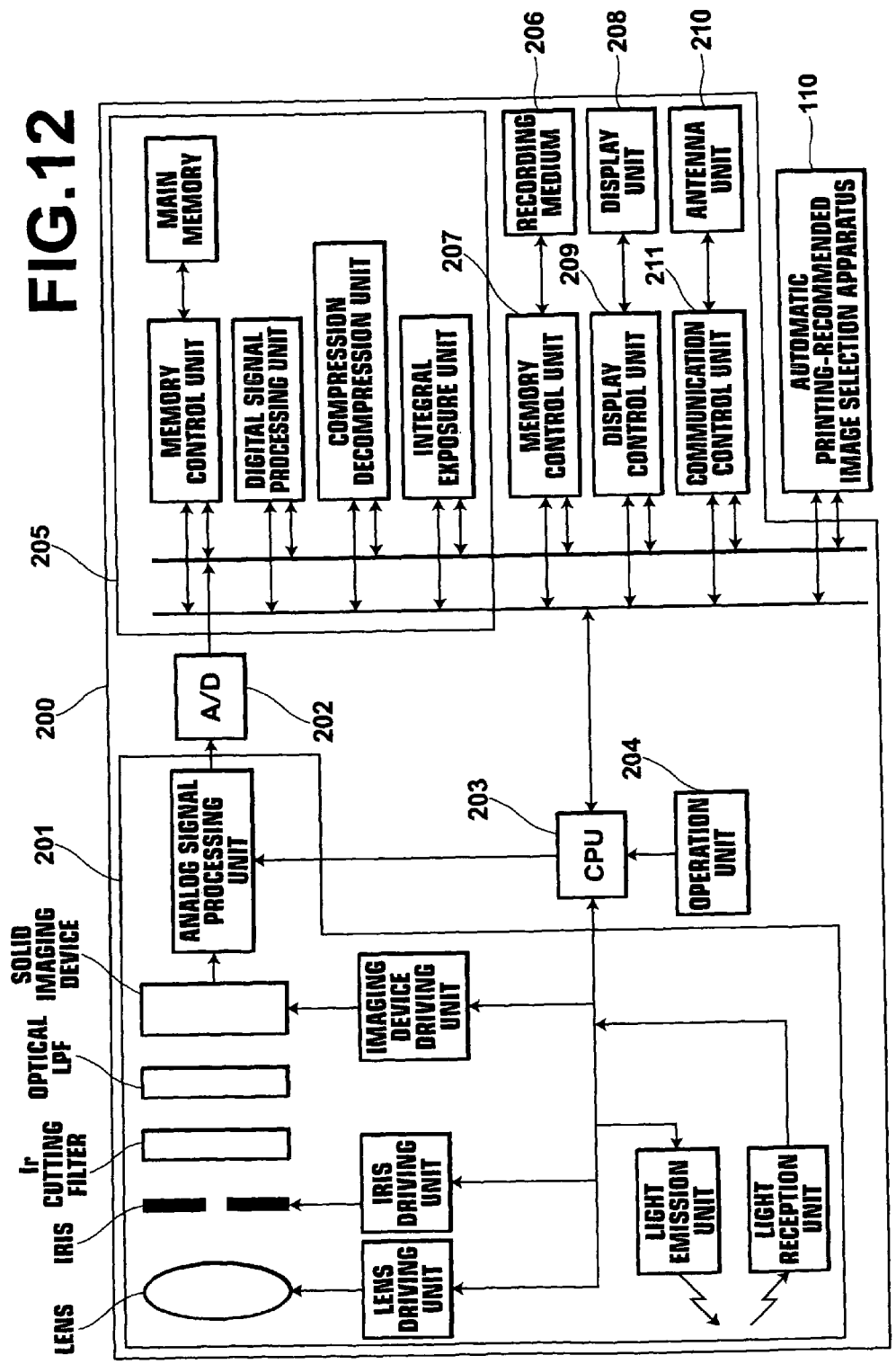
FIG. 12 is a block diagram showing the configuration of a fifth embodiment of the present invention as an application example of the automatic printing-recommended image selection apparatus of the present invention.

FIG. 12 is a block diagram showing the configuration of the fifth embodiment.

A digital camera 200 has an imaging unit 201, an A/D converter 202, a CPU 203, an operation unit 204, an image processing unit 205, a recording medium 206 such as a memory card attachable to and detachable from the digital camera 200, a memory control unit 207 for controlling the recording medium 206, a display unit 208, a display control unit 209 for controlling the display unit 208, an antenna unit 210, a communication control unit 211 for controlling the antenna unit 210. The automatic printing-recommended image selection apparatus in the second or third embodiment is installed in the digital camera 200 or accessible to the digital camera 200 as an external apparatus. In FIG. 12, the digital camera 200 has the automatic printing-recommended image selection apparatus 110.

Figure 13:
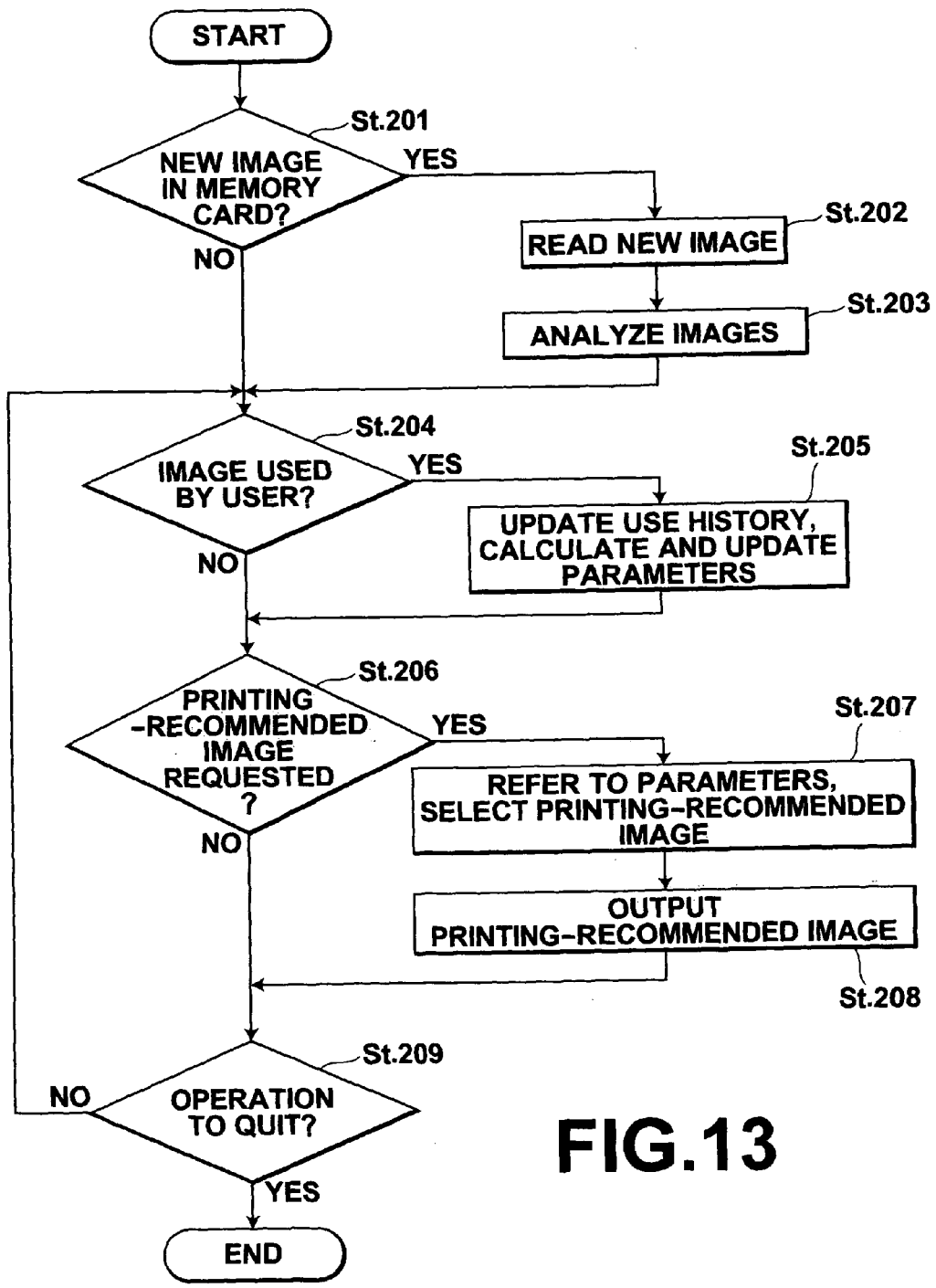
FIG. 13 is a flow chart showing an operation of the automatic printing-recommended image selection apparatus in the fifth embodiment.

Operation of the automatic printing-recommended image selection apparatus in the fifth embodiment will be described below, with reference to FIG. 13.

The memory control unit 207 and the CPU 203 judge whether a new image is stored in the recording medium 206 such as a memory card (St. 201). If a result at St. 201 is affirmative, the automatic printing-recommended image selection apparatus 110 reads the new image from recording medium (St. 202). Here, the recording medium has image data sets for a plurality of images including the new image.

The image analysis unit 114 analyzes the image data set that has been read by the automatic printing-recommended image selection apparatus 110, and obtains the characteristics (the values for the respective technical items and the evaluation value) of the image data set (St. 203). For the image data sets that have already been stored in the recording medium, the image analysis unit 114 has obtained the characteristics in the past.

Whether the user has carried out any operation such as selection, viewing, and reproduction of the images is judged based on operation of the display unit 208 and the operation unit 204 (St. 204). If a result at St. 204 is affirmative, the use history of the user is updated, and the parameter calculation unit 113 calculates the parameters based on the use history and the results of the analysis of the images used by the user, for updating the parameters stored in the data storage unit 112 (St. 205).

Whether the user has carried out a printing-recommended image requesting operation is then judged (St. 206). If a result at St. 206 is affirmative, the printing-recommended image selection unit 111 selects the printing-recommended image from the image data sets stored in the recording medium 206, by using the parameters having been updated (St. 207). The selected image is output from the automatic printing-recommended image selection apparatus 110 to the digital camera 200 to be displayed on the display unit 208 thereof (St. 208).

Whether the user has carried out an operation to quit is then judged (St. 209). If a result at St. 209 is affirmative, the automatic printing-recommended image selection apparatus 110 ends the operation.

Sixth Embodiment

In a sixth embodiment of the present invention, a printer has the automatic printing-recommended image selection apparatus of the second or third embodiment of the present invention.

The printer has the automatic printing-recommended image selection apparatus by installation of the automatic printing-recommended image selection apparatus therein or through access to the automatic printing-recommended image selection apparatus as an external apparatus.

Figure 14:
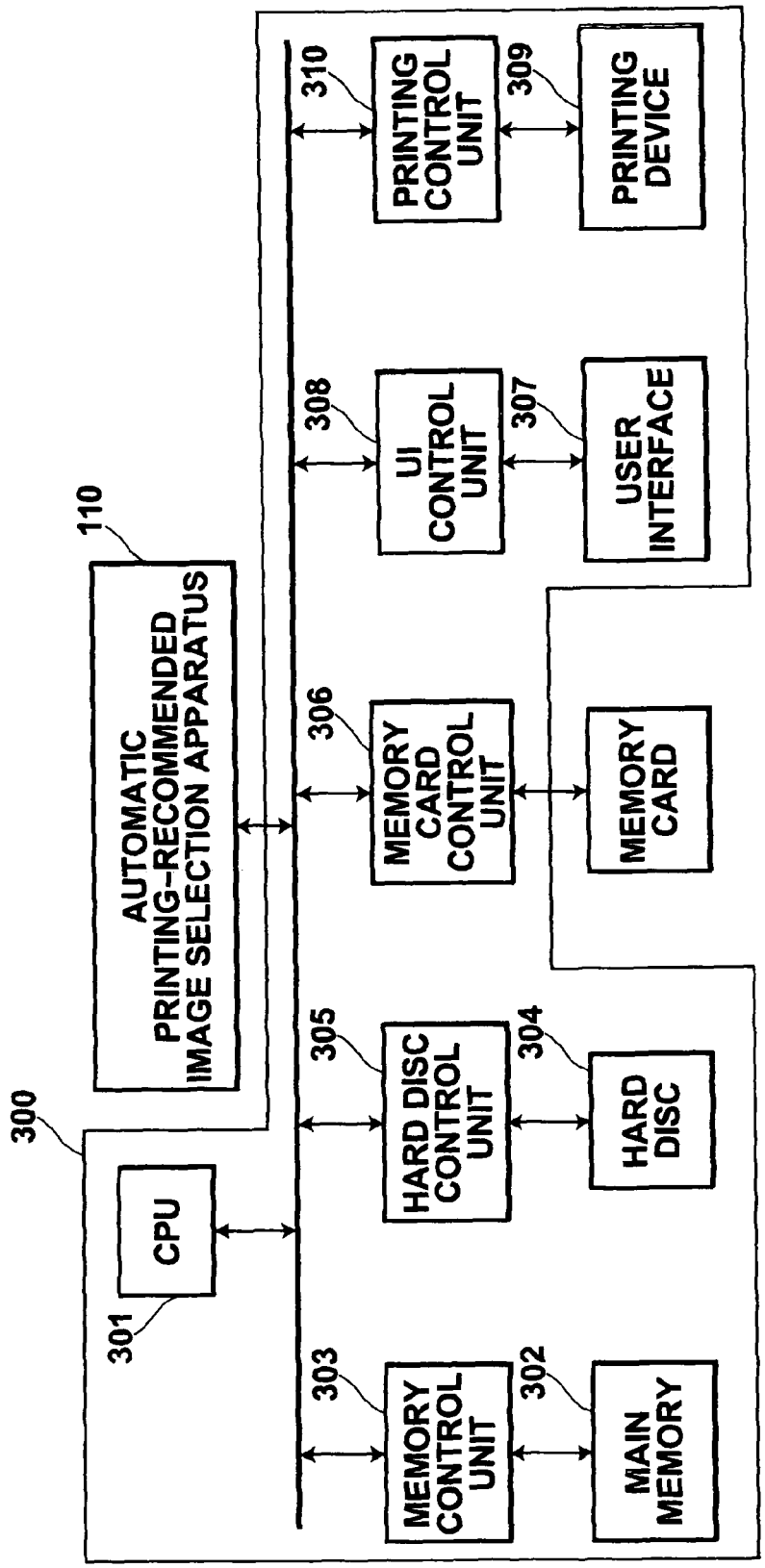
FIG. 14 is a block diagram showing the configuration of a sixth embodiment of the present invention as an application example of the automatic printing-recommended image selection apparatus of the present invention.

FIG. 14 is a block diagram showing the configuration of the sixth embodiment. A printer 300 has a CPU 301, a main memory 302, a memory control unit 303 for controlling the main memory 302, a hard disc 304, a hard disc control unit 305 for controlling the hard disc 304, a memory card control unit 306 for controlling a memory card when the card is inserted, a user interface 307 comprising display means and operation means, a user interface control unit 308 for controlling the user interface 307, a printing device 309, and a printing control unit 310 for controlling the printing device 309. The automatic printing-recommended image selection apparatus 110 or 220 in the second or third embodiment is installed in the printer 300 or accessible to the printer 300 as an external apparatus. In FIG. 14, the printer 300 has the automatic printing-recommended image selection apparatus 110.

Figure 15:
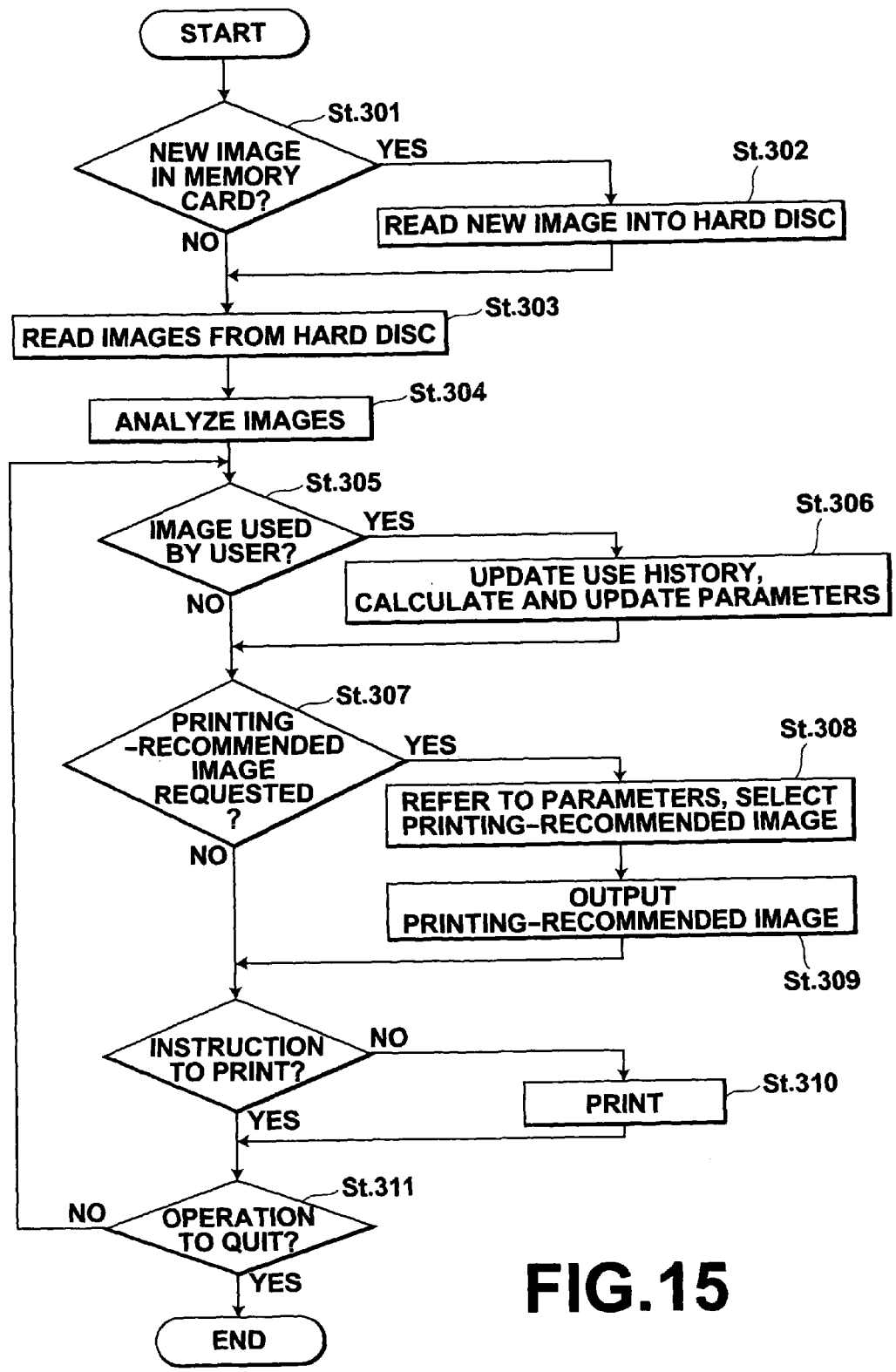
FIG. 15 is a flow chart showing an operation of the automatic printing-recommended image selection apparatus in the sixth embodiment.

Operation of the printing-recommended image selection apparatus in the sixth embodiment will be described below, with reference to FIG. 15.

The memory card control unit 306 and the CPU 301 judge whether a new image is stored in the memory card when the memory card is inserted (St. 301). If a result at St. 301 is affirmative, the automatic printing-recommended image selection apparatus 110 stores the new image in the hard disc 304 (St. 302). Here, the hard disc 304 has image data sets for a plurality of images including the new image.

The automatic printing-recommended image selection apparatus 110 reads the image data sets from the hard disc 304 (St. 303). The image analysis unit 114 analyzes the image data sets that have been read, and obtains the characteristics (the values for the respective technical items and the evaluation value) of the respective image data sets (St. 304).

Whether the user has carried out any operation such as selection, viewing, and reproduction of the images is judged based on operation of the display means and the operation means of the user interface 307 (St. 305). If a result at St. 305 is affirmative, the use history of the user is updated, and the parameter calculation unit 113 calculates the parameters based on the use history and the results of the analysis of the images used by the user, for updating the parameters stored in the data storage unit 112 (St. 306).

Whether the user has carried out a printing-recommended image requesting operation is then judged (St. 307). If a result at St. 307 is affirmative, the printing-recommended image selection unit 111 selects the printing-recommended image from the image data sets read from the hard disc 304, by using the parameters having been updated (St. 308). The selected image is output from the automatic printing-recommended image selection apparatus 110 to the printer 300 to be displayed on the display means or the like thereof (St. 309). In the case where the user prints the printing-recommended image having been displayed, the user inputs an instruction to print, and the printing device 309 prints the printing-recommended image (St. 310).

Whether the user has carried out an operation to quit is then judged (St. 311). If a result at St. 311 is affirmative, the automatic printing-recommended image selection apparatus 110 ends the operation.

Seventh Embodiment

In a seventh embodiment of the present invention, a print order apparatus has the automatic printing-recommended image selection apparatus of the second or third embodiment of the present invention.

The print order apparatus has the automatic printing-recommended image selection apparatus by installation of the automatic printing-recommended image selection apparatus therein or through access to the automatic printing-recommended image selection apparatus as an external apparatus.

The print order apparatus refers to a photograph printing apparatus used in a DPE store or a mini-laboratory, or a self-printing apparatus installed in a store, for example. A user stores images he/she photographed in a recording medium such as a memory card, and brings the recording medium to the store or the like. The user inserts the recording medium in the print order apparatus, and selects any one of the images to print, by using the print order apparatus.

Figure 16:
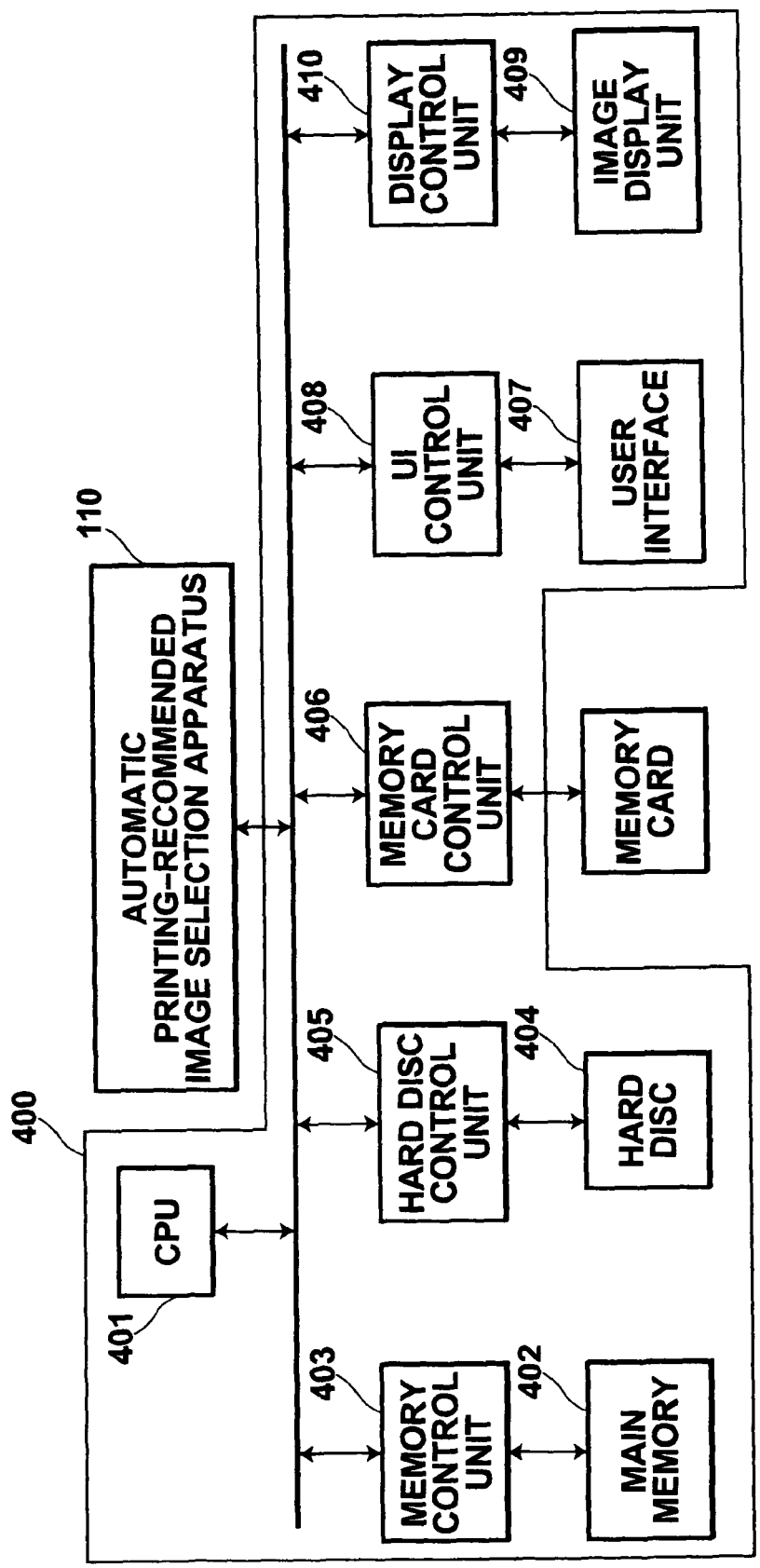
FIG. 16 is a block diagram showing the configuration of a seventh embodiment of the present invention as an application example of the automatic printing-recommended image selection apparatus of the present invention.

FIG. 16 is a block diagram showing the configuration of the seventh embodiment.

A print order apparatus 400 has a CPU 401, a main memory 402, a memory control unit 403 for controlling the main memory 402, a hard disc 404, a hard disc control unit 405 for controlling the hard disc 404, a memory card control unit 406 for controlling a memory card when the card is inserted, a user interface 407 comprising display means and operation means, a user interface control unit 408 for controlling the user interface 407, an image display unit 409, and a display control unit 410 for controlling the image display unit 409. The automatic printing-recommended image selection apparatus 110 or 220 in the second or third embodiment is installed in the print order apparatus 400 or accessible to the print order apparatus 400 as an external apparatus. In FIG. 16, the print order apparatus 400 has the automatic printing-recommended image selection apparatus 110.

Figure 17:
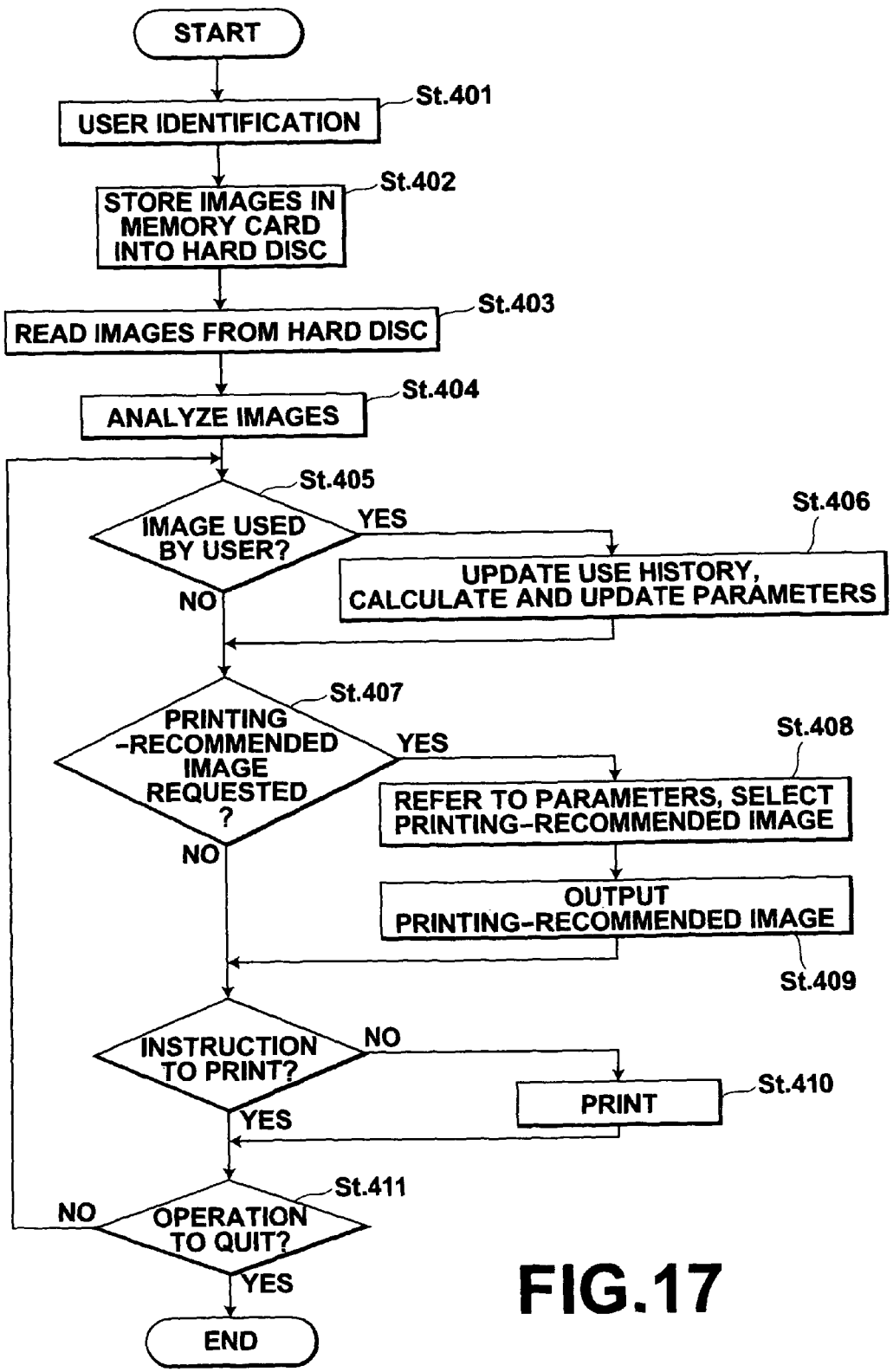
FIG. 17 is a flow chart showing an operation of the automatic printing-recommended image selection apparatus in the seventh embodiment.

Operation of the printing-recommended image selection apparatus in the seventh embodiment will be described below, with reference to FIG. 17.

The user logs onto the print order apparatus 400 by using the operation means of the user interface 407, and inputs user information upon necessity. The use history of the user is identified in the automatic printing-recommended image selection apparatus 110 or the hard disc 404 of the print order apparatus 400, or the like, based on the information that has been input. The automatic printing-recommended image selection apparatus 110 causes the use history of the user to be readable (user identification: St. 401).

When the memory card is inserted in the print order apparatus 400, the images stored in the memory card are stored in the hard disc 404 (St. 402).

The automatic printing-recommended image selection apparatus 110 reads image data sets representing the images from the hard disc 404 (St. 403). The image analysis unit 114 analyzes the image data sets that have been read, and obtains the characteristics (the values for the respective technical items and the evaluation value) of the respective image data sets (St. 404).

Whether the user has carried out any operation such as selection, viewing, and reproduction of the images is judged based on operation of the operation means of the user interface 407 and the image display unit 409 (St. 405). If a result at St. 405 is affirmative, the use history of the user is updated, and the parameter calculation unit 113 calculates the parameters based on the use history and the results of the analysis of the images used by the user, for updating the parameters stored in the data storage unit 112 (St. 406).

Whether the user has carried out a printing-recommended image requesting operation is then judged (St. 407). If a result at St. 407 is affirmative, the printing-recommended image selection unit 111 selects the printing-recommended image from the image data sets read from the hard disc 404, by using the parameters having been updated (St. 408). The selected image is output from the automatic printing-recommended image selection apparatus 110 to the print order apparatus 400 to be displayed on the display unit 409 of the print order apparatus 400 (St. 409). In the case where the user prints the printing-recommended image having been displayed, the user inputs an instruction to print. The printing-recommended image is output from the print order apparatus 400 to a printer or the like where the image is printed (St. 410).

Whether the user has carried out an operation to quit is then judged (St. 411). If a result at St. 411 is affirmative, the automatic printing-recommended image selection apparatus 110 ends the operation.

By applying the automatic printing-recommended image selection apparatus of the second or third embodiment of the present invention to the personal computer, the digital camera, the printer, the print order apparatus, or the like, the user can efficiently select the image to print while reflecting his/her preference. The functions of the automatic printing-recommended image selection apparatus of the second or third embodiment may be installed in the form of programs in the personal computer, the digital camera, the printer, the print order apparatus, or the like. A mobile phone enabling attachment and detachment of a recording medium such as a memory card or a mobile storage having a display screen may also have the printing recommended image selection apparatus applied thereto.

What is claimed is:

1. An image evaluation apparatus, comprising:
   printing status judgment means for judging a printing status of a processing target image assigned with an evaluation value; and
   evaluation value changing means for decreasing the evaluation value based on information representing the printing status,
   wherein the information representing the printing status includes information on whether the target image is currently selected for printing and the evaluation value changing means decreases the evaluation value in a case where the target image is currently selected for printing, said evaluation value comprising a value indicating a degree of importance of the target image, and
   wherein, in said image evaluation apparatus, plural images are classified into plural categories and the evaluation value is calculated based on a number of images in a category of said categories, a number of said categories related to the category, and a number of levels below the category.

2. The image evaluation apparatus according to claim 1, wherein the information representing the printing status includes information on whether the target image has been printed in a past and the evaluation value changing means decreases the evaluation value in a case where the target image has been printed in the past.

3. The image evaluation apparatus according to claim 1, wherein the information representing the printing status includes information on a ratio of a number of images having been primed in a past in an image group comprising images currently selected for printing.

4. The image evaluation apparatus according to claim 1, wherein, in a case where the target image is included in one of the categories, the information representing the printing status includes information on whether said one of the categories including the target image has an image currently selected for printing and the evaluation value changing means decreases the evaluation value in a case where said one of the categories has the image currently selected for printing.

5. The image evaluation apparatus according to claim 4, wherein the information representing the printing status includes information on whether said one of the categories including the target image has an image having been printed in a past and the evaluation value changing means decreases the evaluation value in a case where said one of the categories has the image having been printed in the past.

6. The image evaluation apparatus according to claim 4, wherein the information representing the printing status includes information on whether an upper-level category of said one of the categories including the target image has an image currently selected for printing and the evaluation value changing means decreases the evaluation value in a case where the upper-level category has the image currently selected for printing.

7. An image evaluation method, comprising:
 judging a printing status of a processing target image assigned with an evaluation value; and
 decreasing the evaluation value based on information representing the printing status,
 wherein the information representing the printing status includes information on whether the target image is currently selected for printing and the evaluation value decreasing decreases the evaluation value in a case where the target image is currently selected for printing, said evaluation value comprising a value indicating a degree of importance of the target image, and
 wherein plural images are classified into plural categories, the evaluation value being calculated based on a number of images in a category of said categories a number of said categories related to the category, and a number of levels below the category.

8. A computer-readable storage medium encoded with a computer program for causing a computer to execute an image evaluation method, comprising:
 judging a printing status of a processing target image assigned with an evaluation value; and
 decreasing the evaluation value based on information representing the printing status,
 wherein the information representing the printing status includes information on whether the target image is currently selected for printing and the evaluation value decreasing decreases the evaluation value in a case where the target image is currently selected for printing, said evaluation value being a value indicating an important degree of an image, and
 wherein plural images are classified into plural categories, the evaluation value being calculated based on a number of images in a category of said categories, a number of said categories related to the category, and a number of levels below the category.

* * * * *